United States Patent
Hosoya et al.

(10) Patent No.: US 8,933,840 B2
(45) Date of Patent: Jan. 13, 2015

(54) CONTROL METHOD OF WIRELESS COMMUNICATION SYSTEM, WIRELESS COMMUNICATION SYSTEM, WIRELESS COMMUNICATION APPARATUS, AND ADJUSTMENT METHOD OF ARRAY WEIGHT VECTOR

(75) Inventors: Kenichi Hosoya, Tokyo (JP); Kenichi Maruhashi, Tokyo (JP); Naoyuki Orihashi, Tokyo (JP)

(73) Assignee: NEC Corporation, Tokyo (JP)

( * ) Notice: Subject to any disclaimer, the term of this patent is extended or adjusted under 35 U.S.C. 154(b) by 475 days.

(21) Appl. No.: 13/376,936

(22) PCT Filed: Apr. 28, 2010

(86) PCT No.: PCT/JP2010/003054
§ 371 (c)(1),
(2), (4) Date: Dec. 8, 2011

(87) PCT Pub. No.: WO2010/143353
PCT Pub. Date: Dec. 16, 2010

(65) Prior Publication Data
US 2012/0092217 A1      Apr. 19, 2012

(30) Foreign Application Priority Data
Jun. 8, 2009 (JP) ................................ 2009-137132

(51) Int. Cl.
*H01Q 3/00* (2006.01)
*G01S 5/04* (2006.01)
(Continued)

(52) U.S. Cl.
CPC .............. *H04W 16/28* (2013.01); *H01Q 3/267* (2013.01); *H01Q 3/30* (2013.01); *H04B 7/086* (2013.01)
USPC .......................................... 342/373; 342/443

(58) Field of Classification Search
CPC ............. G01S 3/28; H01Q 3/40; H01Q 3/267
USPC ................. 342/368, 371–373, 443; 455/562.1
See application file for complete search history.

(56) References Cited

U.S. PATENT DOCUMENTS
2007/0205943 A1    9/2007   Nassiri-Toussi et al.

FOREIGN PATENT DOCUMENTS
JP    2000165959 A    6/2000
JP    2000174536 A    6/2000
(Continued)

OTHER PUBLICATIONS
International Search Report for PCT/JP2010/003054 mailed Jun. 15, 2010.
(Continued)

*Primary Examiner* — Dao Phan
(74) *Attorney, Agent, or Firm* — Sughrue Mion, PLLC

(57) ABSTRACT

To suppress adverse effects caused by side lobes of an antenna array when an AWV to be used for communication is determined based on a transmission/reception result of a training signal. A first transceiver generates a fixed beam pattern and transmits a training signal. In that state, a second transceiver receives the training signal while scanning for the main beam direction, and thereby determines a plurality of direction of arrivals (DOAs). Next, the second transceiver receives the training signal in a state where the signal receptions from the plurality of DODs are restricted one by one (e.g., a null direction or a direction close to the null direction is fixed in the DOA), and calculates the change of the signal characteristics from that obtained in the first reception. The transceivers obtain and use at least one AWV having the main beam direction or a sub-beam direction close to the main beam pointing to one of the plurality of DOAs except for the DOA for which the change is lower than a predefined threshold.

24 Claims, 21 Drawing Sheets

(51) Int. Cl.
*H04W 16/28* (2009.01)
*H01Q 3/26* (2006.01)
*H01Q 3/30* (2006.01)
*H04B 7/08* (2006.01)

(56) References Cited

FOREIGN PATENT DOCUMENTS

| JP | 2005195448 A | 7/2005 |
|----|--------------|--------|
| JP | 2006245986 A | 9/2006 |
| JP | 2008160532 A | 7/2008 |
| JP | 2008228013 A | 9/2008 |
| WO | 2008090836 A | 7/2008 |

OTHER PUBLICATIONS

K. Maruhashi et al., "60-GHz-band LTCC Module Technology for Wireless Gigabit Transceiver Applications", IEEE International Workshop on Radio-Frequency Integration Technology, Digest. pp. 131-134, Dec. 2005.

K. Ohata et al., "1.25Gbps Wireless Gigabit Ethernet Link at 60-GHz-Sand", IEEE MTT-S International Microwave Symposium, Digest, TU4D-6, pp. 373-376. Jun. 2003.

J. F. Buckwalter et al., "An integrated Subharmonic Coupled-Oscillator Scheme for a 60-GHz Phased-Array Transmitter", IEEE Transactions on Microwave Theory and Techniques, vol. 12, pp. 4271-4280, Dec. 2006.

S. Alalusi et al., "A 60 GHz Phased Array in CMOS", IEEE 2006 Custom Integrated Circuits Conference, Digest, pp. 393-396, Sep. 2006.

I. Lakkis et al., "TG3c Call for Proposals", IEEE P802.15 Working Group for Wireless Personal Area Networks (WPANS), pp. 1-43. 15-08-0355-00-003c, May 14, 2008.

K. Sato et al., "Channel Model for Millimeter Wave WPAN", The 18th Annual IEEE International Symposium on Personal, Indoor and Mobile Radio Communications (PIMRC '07), 2007.

CONTROL METHOD OF WIRELESS COMMUNICATION SYSTEM, WIRELESS COMMUNICATION SYSTEM, WIRELESS COMMUNICATION APPARATUS, AND ADJUSTMENT METHOD OF ARRAY WEIGHT VECTOR

TECHNICAL FIELD

The present invention relates to a system that performs wireless communication by adaptively controlling radio beams, and its control method.

BACKGROUND ART

In recent years, use of wireless devices using wideband millimeter waves (30 GHz to 300 GHz) has become increasingly widespread. The millimeter-wave radio technology has been expected to be used especially for high-rate wireless data communication in the order of gigabit such as wireless transmission of high-resolution images (for example, see Non-patent literatures 1, 2 and 3).

However, millimeter waves having high frequencies have a high rectilinear propagation property, and therefore they pose a problem in cases where wireless transmission is to be implemented indoors. In addition to the high rectilinear propagation property, millimeter waves are significantly attenuated by a human body or a similar object. Therefore, if a person stands between the transmitter and the receiver in a room or a similar circumstance, no unobstructed view can be obtained, thus making the transmission very difficult (shadowing problem). This problem results from the fact that the propagation environment has been changed because of the increase in the rectilinear propagation property of the radio waves, which results from the increase in the frequency. Therefore, this problem is not limited to the millimeter waveband (30 GHz and above). Although it is impossible to clearly specify the transition frequency at which the propagation environment of the radio waves changes, it has been believed to be around 10 GHz. Note that according to recommendations of the International Telecommunications Union ("Propagation data and prediction methods for the planning of indoor radio communication systems and radio local area networks in the frequency range 900 MHz to 100 GHz," ITU-R, P. 1238-3, April, 2003), a power loss coefficient, which indicates the attenuation amount of a radio wave with respect to the propagation distance, is 22 for 60 GHz in an office, while it is 28 to 32 for 0.9 to 5.2 GHz. Considering that it is 20 in the case of free-space loss, the effects of scattering, diffraction, and the like are considered to be small in higher frequencies such as 60 GHz.

To solve the problem described above, Patent literature 2, for example, discloses a system in which a plurality of transmission paths are provided by installing a plurality of receiving units in the receiving device, so that when one of the transmission paths between the transmitting device and the receiving units is shielded, the transmission is carried out by another transmission path(s).

Further, as another method for solving the problem, Patent literature 3 discloses a contrivance to secure a plurality of transmission paths by installing reflectors on the walls and ceilings.

The method disclosed in Patent literature 2 cannot carry out transmission when shielding occurs in the vicinity of the transmitting device or when all of the installed receiving units are shielded. Meanwhile, the method disclosed in Patent literature 3 requires users to give particular consideration to the configuration. For example, the reflectors need to be installed with consideration given to the positions of the transmitter and the receiver.

However, recent studies on propagation properties of millimeter waves have found out that reflected waves could be utilized without intentionally installing reflectors. FIG. 21 shows a configuration of a system using a wide-angle antenna, and FIG. 22 shows an example of a delay profile of a system using a wide-angle antenna like the one shown in FIG. 21 when the system is used indoors. In the system using the wide-angle antennas shown in FIG. 21, the received power of the dominant wave, which arrives faster than any other waves, is larger than that of any other waves as shown in FIG. 22. After that, although delayed waves such as the second and third waves arrive, their received power is smaller. These second and third waves are waves reflected from the ceiling and the walls. This situation is remarkably different from the propagation environment of radio waves having a lower rectilinear propagation property, such as a 2.4 GHz band used in wireless LANs (Local Area Networks). In 2.4 GHz band, it is very difficult to clearly separate waves in their directions of Arrival (DOAs) because of the effects of diffraction and multiple reflections. In contrast to this, in the millimeter waves having a high rectilinear propagation property, although radio waves are relatively clearly distinguished in their DOAs, the number of delayed waves is limited and their received-signal levels are small.

Therefore, when the direct wave is blocked, it is necessary to ensure a sufficient received-signal level by pointing a narrow beam having a high directive gain to a DOA of a reflected wave as shown in FIGS. 20A and 20B in order to continue the transmission by using the reflected wave. However, in order to eliminate the necessity for the user to take the trouble in regard to the relative positions of the transmitter and receiver, and the like, a beam forming technique capable of dynamically controlling a narrow beam is indispensable.

In the beam forming, it is necessary to construct an antenna array. For millimeter waves having a short wavelength (e.g., 5 mm in the case of a frequency of 60 GHz), the antenna array can be implemented in a small area, and phase shifter arrays and oscillator arrays for use in those antenna arrays have been developed (for example, see Non-patent literatures 3 and 4).

Further, as a technique for a different purpose from the beam forming using an antenna array, direction-of-arrival (DOA) estimation techniques have been known. The DOA estimation techniques are used in, for example, radars, sonar, and propagation environment measurements, and used for estimating DOAs and power of radio waves to be received at antenna arrays with high accuracy. For example, a beam former method has been known as an algorithm that can be used for such techniques.

When these DOA estimation techniques are used in propagation environment measurement with an installed radio wave source, an omni (nondirectional) antenna is often used as the radio wave source. Non-patent literature 6 shows an example of such a technique.

CITATION LIST

Patent Literature

Patent literature 1: International Patent Publication WO 2008/090836
Patent literature 2: Japanese Unexamined Patent Application Publication No. 2006-245986
Patent literature 3: Japanese Unexamined Patent Application Publication No. 2000-165959

Patent literature 4: United States Patent Application Publication No. 2007/0205943
Patent literature 5: Japanese Unexamined Patent Application Publication No. 2000-174536
Patent literature 6: Japanese Unexamined Patent Application Publication No. 2008-160532
Patent literature 7: Japanese Unexamined Patent Application Publication No. 2008-228013

Non Patent Literature

Non-patent literature 1: K. Maruhashi et al., "60-GHz-band LTCC Module Technology for Wireless Gigabit Transceiver Applications", IEEE International Workshop on Radio-Frequency Integration Technology, Digest, pp. 131-134, Dec, 2005.
Non-patent literature 2: K. Ohata et al., "1.25Gbps Wireless Gigabit Ethernet Link at 60-GHz-Band", IEEE MTT-S International Microwave Symposium, Digest, pp. 373-376, June 2003.
Non-patent literature 3: J. F. Buckwalter et al., "An Integrated Subharmonic Coupled-Oscillator Scheme for a 60-GHz Phased-Array Transmitter", IEEE Transactions on Microwave Theory and Techniques, Vol.12, pp. 4271-4280, Dec. 2006.
Non-patent literature 4: S. Alausi et al., "A 60 GHz Phased Array in CMOS", IEEE 2006 Custom Integrated Circuits Conference, Digest, pp. 393-396, San Jose, Sept. 2006.
Non-patent literature 5: 1. Lakkis et al., "IEEE P802.15 Working Group for Wireless Personal Area Networks (WPANS): TG3c Call for Proposals", 15-08-0355-00-003c, May 2008.
Non-patent literature 6: K. Sato et al., "Channel model for millimeter-wave WPAN", The 18th Annual IEEE International Symposium on Personal, Indoor and Mobile Radio communications (PIMRC '07), 2007.

SUMMARY OF INVENTION

Technical Problem

When the direct wave is blocked and the radio transmission is to be continued by using a reflected wave in indoor millimeter-wave systems, the following problem arises.

When the wave to be used (direct wave, reflected wave) is switched, it is desirable to decrease the time during which the transmission is disconnected. Such reduction of the transmission-disconnected time becomes especially an important requirement, for example, in the transmission of non-compressed images that requires a real-time capability. Meanwhile, when a reflected wave is used, it is necessary to increase the directive gain of the antenna by narrowing the antenna beam width and thereby to increase the reception strength.

However, the number of directions (steps) in which the search needs to be performed increases as the beam width becomes narrower. Therefore, the time necessary to search the beam directions and thereby set an optimal beam direction becomes longer, and therefore transmission-disconnected time also becomes longer. Accordingly, it has been desired to develop a beam direction setting method that can shorten the transmission-disconnected time even in such situations. It should be noted that the use of a device capable of temporally storing data is impractical because a huge buffer memory is required when the transmission-disconnected time becomes longer.

FIG. 4 shows an example of a configuration of a transceiver used for a beam forming (circuits that are inessential for the explanation of the operation are omitted). The transceiver includes M transmitting antennas and N receiving antennas. A transmitter 401 includes a transmitter circuit 403 to which external data is input. The output of the transmitter circuit 403 is branched into M signals, and they are input to respective AWV (array weight vector) control circuits 404-1 to 404-M. Each signal is changed either in its amplitude or in its phase, or both in its amplitude and in its phase, and eventually output through a transmitting antenna array composed of respective antenna elements 405-1 to 405-M. Each of the AWV control circuits 404-1 to 404-M can be implemented by, for example, series connection of an analog phase shifter and a variable-gain amplifier. In such a configuration, both the amplitude and phase of the signal are controlled in a continuous manner. Further, when the AWV control circuits 404-1 to 404-M are implemented by digital phase shifters, only the phases of the signals are controlled in a discrete manner. AWVs that are controlled by the AWV control circuits 404-1 to 404-M are, in general, expressed as the following Expression (1):

$$\vec{W} = [w_1, w_2, \ldots, w_M]^T \qquad (1)$$

where $w_1$, $w_2$, $w_M$ are complex numbers and the superscript T indicates transposition. Further, when only the phases are controlled, Expression (1) can be expressed as the following Expression (2):

$$\vec{W}[e^{j\Theta_1}, e^{j\Theta_2}, \ldots, e^{j\Theta_M}]^T \qquad (2)$$

where $\Theta_1, \Theta_2, \ldots, \Theta_M$ are phase control amounts.

Further, a process/arithmetic circuit 406 provides instructions about the AWV setting of the AWV control circuits 404-1 to 404-M through a control circuit 407. With the change made to both or either of the amplitude and the phase of each signal, it is possible to control the direction, the width, and/or the like of the beam emitted from the transmitter.

Meanwhile, a receiver 402 has a reversed configuration with respect to the transmitter 401. Signals received by a receiving antenna array composed of antenna elements 411-1 to 411-N are adjusted in both or either of amplitudes and phases in AWV control circuits 410-1 to 419-N and combined. Then, the combined data is externally output through a receiver circuit 409. As in the case of the transmitter 401, a process/arithmetic circuit 406 controls both or either of the amplitude and phase of the AWV control circuits 410-1 to 419-N.

FIG. 5 is a conceptual diagram of a wireless communication system including two transceivers (400 and 500) each having the configuration shown in FIG. 4. The transceiver 500 has K transmitting antennas and L receiving antennas.

Characteristics of a propagation path between two communication devices are expressed by a channel state information matrix. It has been known that if this channel state-information matrix is determined, the optimal phase combination of the antenna array of the transceiver can be obtained by using SVD (Singular-Value Decomposition). However on the other hand, since SVD is complex and requires a long processing time, it is very difficult to implement SVD, for example, in a non-compressed image transmission apparatus that requires a high-rate processing capability.

Accordingly, Patent literature 4, for example, discloses a method for obtaining an optimal AWV with which the signal strength is maximized by adding a unitary matrix (e.g., Hadamard matrix) as; phases of the antenna array and repeating the training of the antenna array of the transmitter and the training of the antenna array of the receiver. Although this method can reduce the processing time in comparison to SVD, it still requires a certain time to obtain the optimal AWV combination because the switching between the transmission and the reception needs to be repeatedly carried out.

Meanwhile, Non-patent literature 5 discloses a technique to optimize a transmitting/receiving beam direction by gradually increasing the beam resolution. However, this technique also requires measuring communication quality for a number of combinations of the transmitting/receiving beam directions while repeatedly carrying out the switching between the transmission and the reception, and thereby requiring a huge amount of time to obtain an optimal beam combination.

Further, Non-patent literature 5 also brings up an idea called "quasi-omni (quasi-nondirectional) pattern" as a beam having the lowest resolution. This quasi-omni pattern means a pattern having a constant antenna gain over a very wide angle in the space around the transceiver, though it is not a complete omni (nondirectional) pattern. Since it is often very difficult to obtain a complete omni pattern with millimeter-wave antenna arrays, this quasi-omni pattern is often used as a substitute in such cases.

In general, when a link is to be established at the initial stage, it would be acceptable if the acquisition of an optimal AWV combination requires a long time. However, in a case where a link needs to be re-established when disconnection of the transmission occurs in the previously-established link, a swift search for another optimal AWV combination is required. Further, in the case of multipoint communication, a faster search for an optimal AWV combination is also required because it requires re-establishment of a plurality of links.

In view of the above-described problems existing in the related art, the inventors of the present application have proposed a/radio control method capable of reducing a time necessary to find and set a beam direction and thereby reducing transmission-disconnected times in a previously-filed patent application (Japanese Patent Application No. 2008-240156 filed on Sep. 19, 2008). Further, the inventors of the present application have also found out that when an AWV to be used in communication between communication devices is determined based on a transmission/reception result of a training signal, the presence of side lobes of the antenna array could become an obstacle depending on the propagation environment and/or the characteristics of the antenna array, and have proposed a radio control method with a solution to this problem in another previously-filed patent application (Japanese Patent Application No. 2008-282697 filed on Nov. 4, 2008). This method is effective for solving two problems that could be induced by side lobes (i.e., blunting of angle profiles and emergence of peaks resulting from side lobes). However, depending on the circumstances, there are cases where only the latter problem arises. In such cases, it is effective to adopt a simpler method that is effective only for the latter problem.

The present invention has been made in view of the above-described problems, and an object thereof is, in communication devices that perform wireless communication by performing beam forming, to avoid one of the adverse effects caused by side lobes of the antenna array (i.e., emergence of peaks resulting from side lobes) when an AWV to be used for communication is determined based on a transmission/reception result of a training signal by using a simple method.

Solution to Problem

A first aspect according to the present invention includes a control method of a wireless communication system including first and second communication devices. The second communication device includes an antenna array, and an array weight vector (hereinafter "AWV") control circuit that changes at least one of amplitudes and phases of transmission signals or received signals of a plurality of antenna elements included in the antenna array. A control method according to this aspect includes following processes (a) to (f) that are performed when an AWV of at least two antenna elements among the plurality of antenna elements included in the antenna array is independently controlled:

(a) receiving, in the second communication device, while scanning a beam direction by changing an AWV of the antenna array of the second communication device, a training signal transmitted from the first communication device by using a fixed beam pattern;

(b) determining at least one direction of arrival (DOA) in the second communication device based on reception signal characteristics of the training signal;

(c) receiving, in the second communication device, the training signal transmitted by the first communication device while changing the AWV of the antenna array of the second communication device in such a manner that a null direction or a direction close to the null direction is successively pointed to one by one from the at least one DOA;

(d) comparing a reception signal characteristic obtained in the step (a) with a reception signal characteristic obtained in the step (c) for each of the at least one DOA, and specifying a DOA for which a ratio or a difference between these reception signal characteristics is smaller than a predefined threshold;

(e) obtaining at least one AWV each having a main beam direction or a sub-beam direction close to the main beam pointing to a one of the at least one DOA in the second communication device determined in the step (b) except for the DOA specified in the step (d); and (f) using the at least one AWV obtained in the step (e) for communication between the first and second communication devices.

A second aspect according to the present invention also includes a control method of a wireless communication system including first and second communication devices. The second communication device includes an antenna array, and an array weight vector (AWV) control circuit that changes at least one of amplitudes and phases of transmission signals or received signals of a plurality of antenna elements included in the antenna array. A control method according to this aspect includes following processes (a) to (f) that are performed when an AWV of at least two antenna elements among the plurality of antenna elements included in the antenna array is independently controlled:

(a) radiating, by the second communication device, a training signal while scanning a beam direction by changing an AWV of the antenna array in a state where the first communication device is performing a receiving operation by using a fixed beam pattern;

(b) determining at least one direction of departure (DOD) of the second communication device based on reception signal characteristics of the training signal in the first communication device;

(c) radiating, from the second communication device, the training signal while changing the AWV of the antenna array in such a manner that a null direction or a direction close to the null direction is successively pointed to one by one from the at least one DOD in a state where the first communication device is performing a receiving operation by using the fixed beam pattern;

(d) comparing a reception signal characteristic of the first communication device obtained in the step (a) with a reception signal characteristic of the first communication device obtained in the step (c) for each of the at least one DOD, and specifying an DOD for which a ratio or a difference between these reception signal characteristics is smaller than a predefined threshold;

(e) obtaining at least one AWV each having a main beam direction or a sub-beam direction close to the main beam pointing to one of the at least one DOD of the second communication device determined in the step (b) except for the DOD specified in the step (d); and (f) using the at least one AWV obtained in the step (e) for communication between the first and second communication devices.

Advantageous Effects of Invention

According to the present invention, in communication devices that perform wireless communication by performing beam forming, when an AWV to be used for communication is determined based on a transmission/reception result of a training signal, it is possible to alleviate, by using a simple method, the problem of the peak emergence resulting from side lobes which is one of the adverse effects caused by side lobes of the antenna array.

DESCRIPTION OF EMBODIMENTS

Specific exemplary embodiments to which the present invention is applied are explained hereinafter in detail with reference to the drawings. The same signs are assigned to the same components throughout the drawings, and duplicate explanation is omitted; as appropriate for clarifying the explanation.

<First Exemplary Embodiment>

Figure 5:
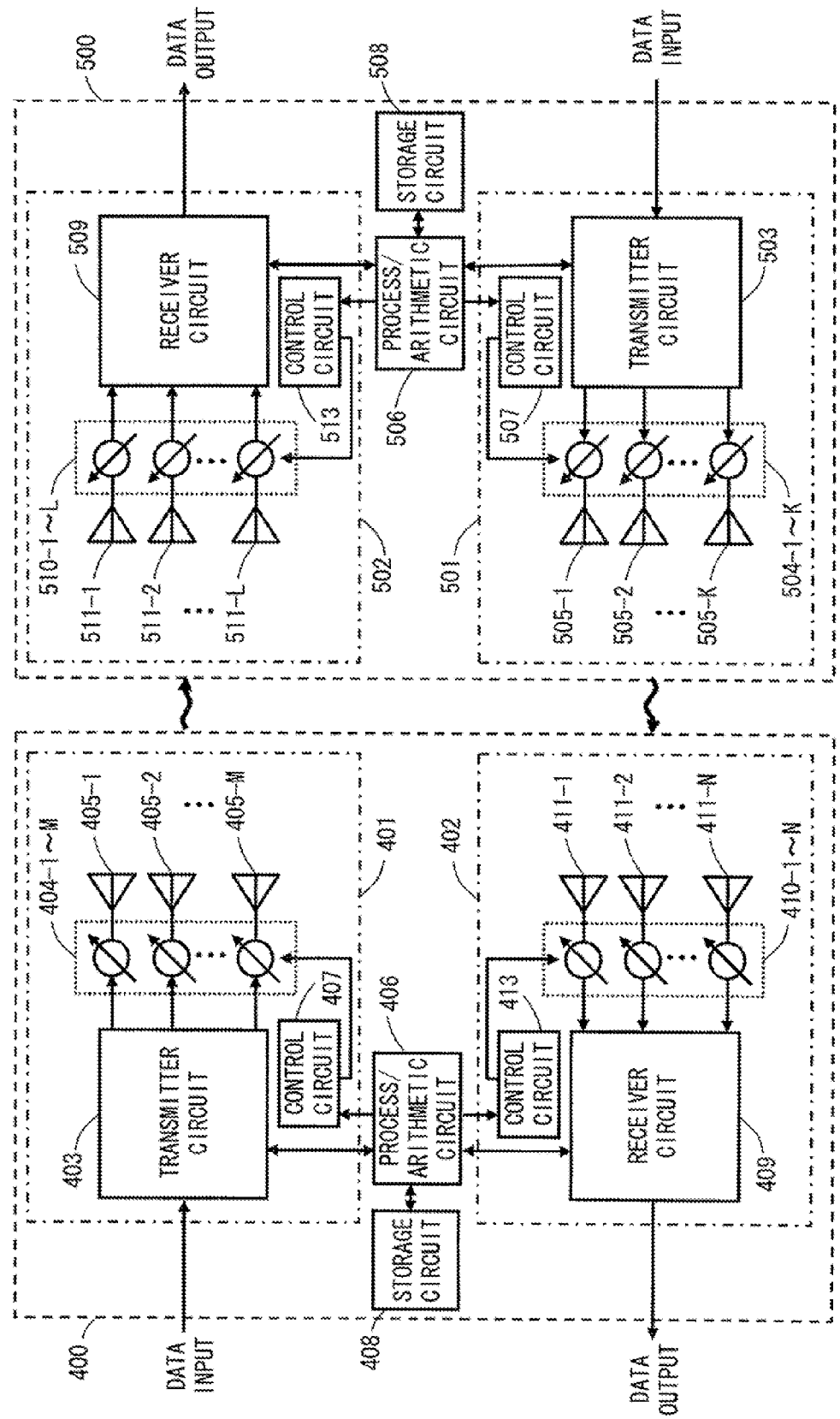
FIG. 5 a schematic view for illustrating a wireless communication system composed of two transceivers.

A first exemplary embodiment of the present invention is explained hereinafter with reference to a transition diagram shown in FIG. 1. It should be noted that a device configuration shown in FIG. 5, for example, can be used as the device configuration of the wireless communication system according to this exemplary embodiment.

Figure 1:
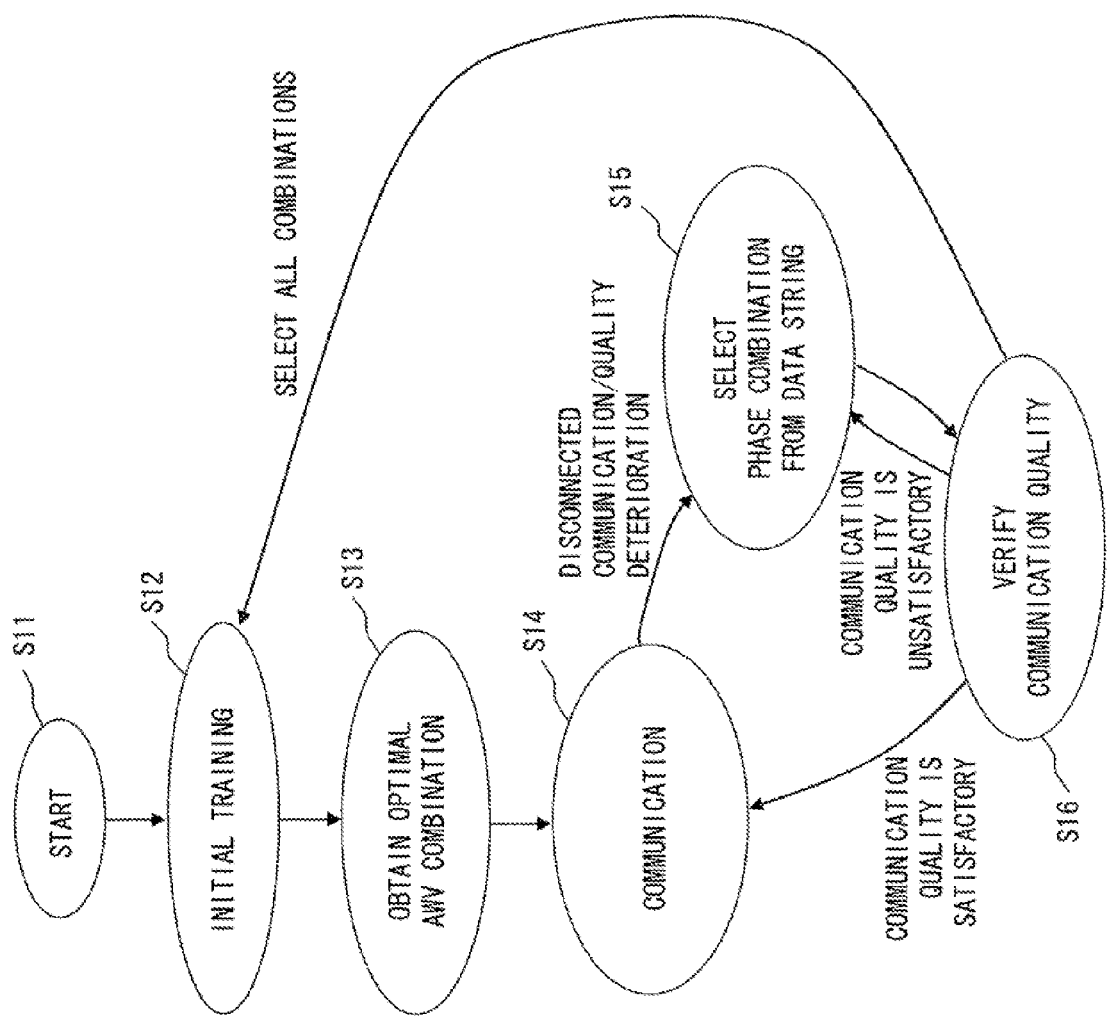
FIG. 1 shows transitions in radio control procedure according to a first exemplary embodiment of the present invention.

In a state S12 in FIG. 1, transceivers 400 and 500 perform an initial training to optimize AWV control circuits 404-1 to 404-M, 410-1 to 410N, 504-1 to 504K, and 510-1 to 510L provided therein. In S13, candidate AWV combinations are calculated by a process/arithmetic circuit 406 or 506 or by cooperation of these two circuits. The calculation method for candidate AWV combinations in S13 will be explained later. The obtained candidate AWV combinations are stored as a data string in both or either of the storage circuits 408 and 508.

In S14, one of the candidate AWV combinations obtained in S13 is selected, and communication is performed by using the selected combination. The way of selecting an AWV combination is also explained later. The transceivers 400 and 500 monitor the communication state while the communication is continued. For example, when the transceiver 500 is operated for reception, this monitoring may be implemented by measuring the communication quality in the receiver circuit 509 or the process/arithmetic circuit 506. For example, communication quality such as a received-signal level, a signal to noise ratio (SNR), a hit error rate (BER), a packet error rate (PER), and a frame error rate (FER) may be measured. Meanwhile, the monitoring of the communication state in the transceiver 400, which is operated as a transmitter at this time, may be implemented by measuring a reception of a communication quality deterioration alert from the transceiver 500 or a reception of a reception confirmation response (ACK). It should be noted that since publicly-known common techniques may be used as the communication state monitoring technique, detailed explanation of the monitoring technique in this exemplary embodiment is omitted.

When deterioration in communication quality such as disconnected communication is detected while the communication is continued, the transceivers 400 and 500 select another AWV combination from the data string stored in both or either of the storage circuits 408 and 508 (S15).

In a state S16, it is determined whether the quality of the communication using the newly selected AVW combination is satisfactory or not. In the case where the transceiver 500 is operated for reception, for example, the pass/fail of the communication quality is determined by measuring a received-signal level, an SNR, or the like at the receiver circuit 509 or the process/arithmetic circuit 506. If the communication quality is determined to be satisfactory in S16, the transceivers 400 and 500 return to the communication state (S14). On the other hand, if the communication quality is determined to be unsatisfactory in S16, the transceivers 400 and 500 change to S15 and select another AWV combination again.

If no AWV combination with which a satisfactory communication state is achieved is found from the AWV combinations stored in the storage circuits 408 and 508, the process returns to and repeats from the initial training.

Next, a procedure for the initial training in S12 shown in FIG. 1 and a procedure to obtain candidate AWV combinations in S13 are explained hereinafter.

Firstly, the transceiver 400 is operated for transmission, and its AWV is set so as to generate an omni or quasi-omni pattern. The transceiver 400 transmits a training signal in that state. The training signal arrives at the transceiver 500 through a plurality of propagation paths.

At this point, the transceiver 500 is operated for reception. Further, the transceiver 500 operates its antenna array 511-1 to 511-L, receiver circuit 509, control circuit 513, process/arithmetic circuit 506 in a connected manner so as to scan the main beam direction by changing the AWV of the antenna array, and thereby obtains a data string describing a relation between DOAs and received powers in the transceiver 500 performing the receiving operation. In the following explanation, a data string describing a relation between DOAs and received-signal powers is called "angle profile". Control of an AWV and acquisition of an angle profile may be implemented by using a commonly-known DOA estimation algorism. The DOA estimation algorithm is a technique used in radars, sonar, propagation environment measurements, and the likes, and there are various algorithms. For example, a beam former method may be applied. Further, although an angle profile describing a relation between DOAs and received powers is obtained in the above-described example, the DOA may be associated with any reception signal characteristic other than the received-signal power. Examples of the reception signal characteristic other than received-signal power include an SNR (Signal to Noise Ratio) and the like.

Figure 6:
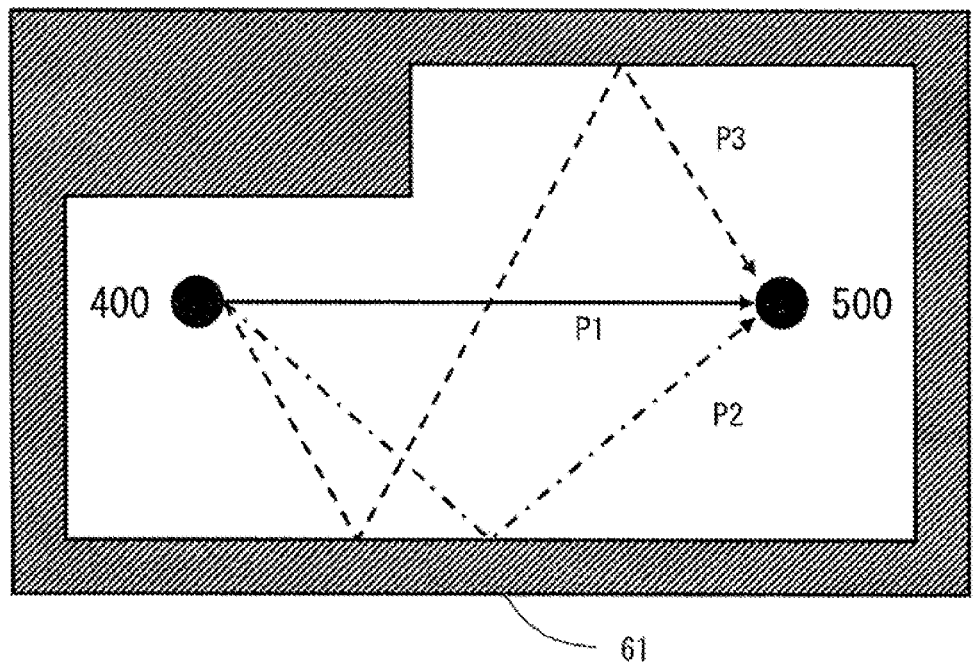
FIG. 6 is a plane view illustrating an example of propagation environment to which the present invention can be applied.

For example, assume a propagation environment shown in FIG. 6. In the example shown in FIG. 6, the transceivers 400 and 500 are disposed inside a room (two dimensions) enclosed with a wall 61. Assume that there are three propagation paths P1 to P3 between the transceivers 400 and 500 as available paths for communication. Under an ideal situation using an antenna array having a sufficiently small side lobe level, an angle profile indicating a relation between received-signal powers and DOAs like the schematic diagram shown in FIG. 7 can be obtained by performing a DOA estimation algorithm. By detecting peaks (three peaks in this example) of this profile, it should be possible to detect the DOAs, i.e., directions of propagation paths available for the communication. Assume that a priority order is assigned to detected propagation paths or their directions (in practice, to corresponding AWV), for example, in the descending order of the received-signal power, and that they are successively used for the communication. The term "successively" means to change a propagation path having a higher priority to another propagation path having the next priority when the communication characteristics of the propagation path having the higher priority are deteriorated by shielding or the like. The concept that a plurality of AWVs available for communication are prepared in advance and they are used one by one (i.e., successively) during actual communication is disclosed, for example, in Patent literatures 1 and 5. Further, a technique for ranking AWWs according to the received-signal power is disclosed, for example, in Patent literature 6.

Figure 7:
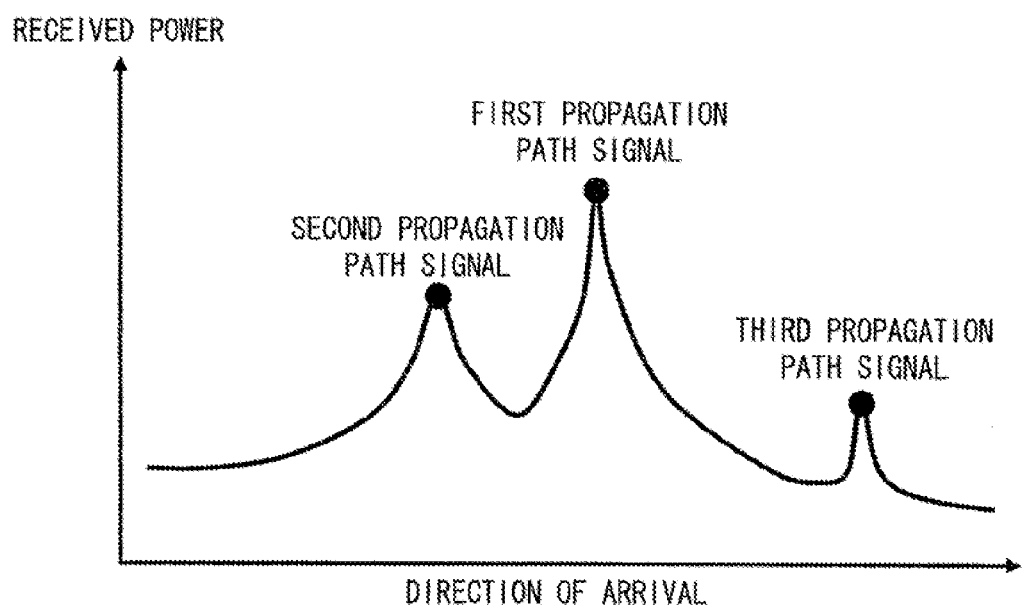
FIG. 7 is a schematic diagram showing an example of an angle profile obtained during control procedure according to an exemplary aspect of the present invention.

Note that a planar (two-dimensional) propagation environment as shown in FIG. 6 is assumed for simplifying the explanation, and therefore the horizontal axis in FIG. 7 indicates DOA as one-dimensional value. It is also assumed that the antenna array has one dimension. However, the present invention can be also applied to other cases where a 2D (two-dimensional) antenna array is used in a three-dimensional (3D) propagation environment. In such cases, the horizontal axis in FIG. 7 represents 2D arrays each composed of two angles.

Figure 8:
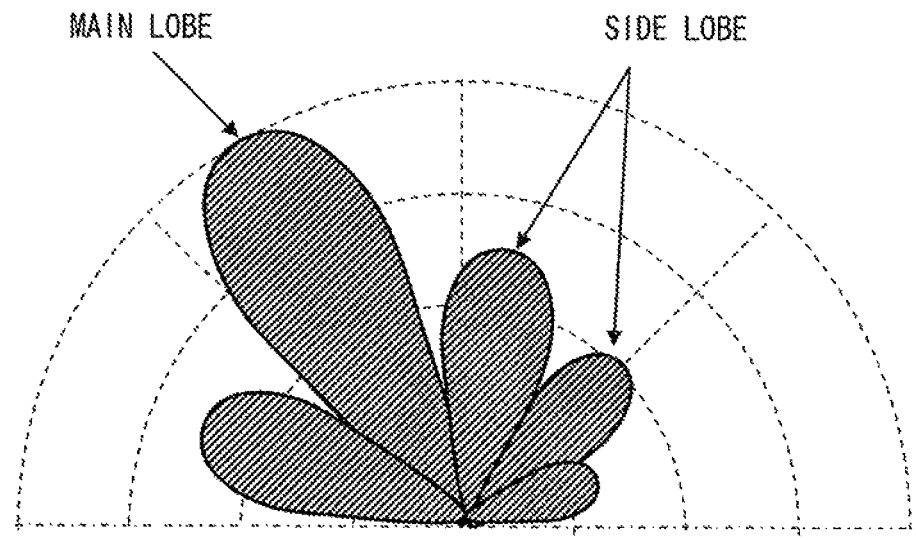
FIG. 8 is a schematic diagram for explaining a main lobe and side lobes in an antenna array.

The influence of side lobes of an antenna array on the measurement accuracy of an angle profile is examined hereinafter. It has been stated in the above explanation that the main beam direction, i.e., main lobe is scanned by operating the transceiver 500 for reception. However, an actual antenna array has electric field radiation components called "side lobes" in addition to the main lobe. FIG. 8 schematically shows its aspect.

Figure 9:
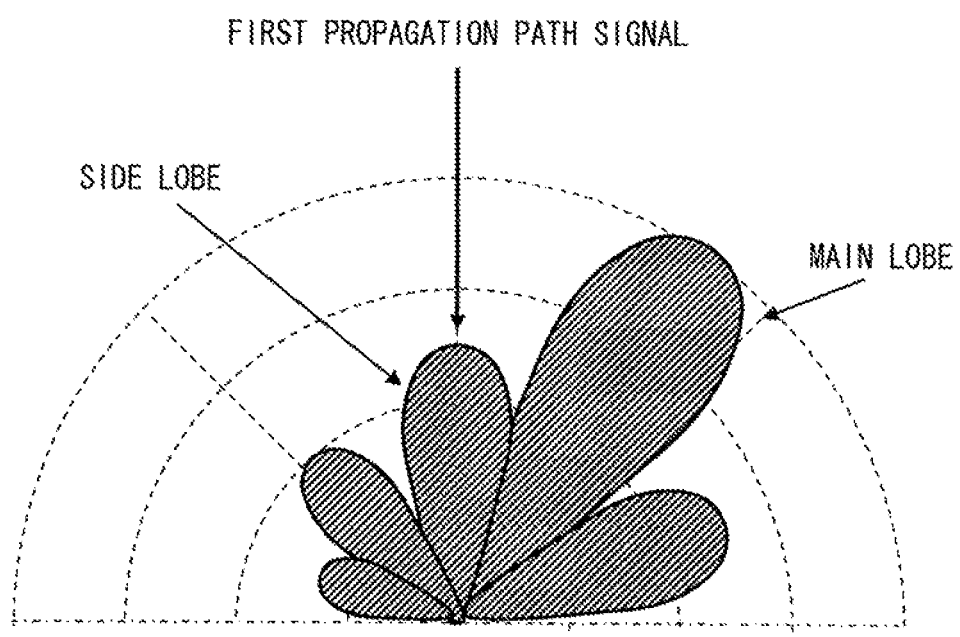
FIG. 9 is a schematic diagram for explaining the influence of side lobes.

As shown in FIG. 9, when a training signal is to be received while scanning the main lobe, a signal coming from a direction other than the main lobe direction (direction called "DOA" regardless of the presence or absence of the incoming signal) could be received by a side lobe. This signal received by the side lobe is combined with the signal received by the main lobe within the receiver circuit 509, and thereby affecting the received-signal power (or other reception signal characteristics) to be measured. Since the way of influence depends on the phase difference between the signal received by the main lobe and the signal received by the side lobe, it does not necessarily become a simple addition. Although the above explanation is made by using a receiving operation as an example, a similar phenomenon also occurs in a transmitting operation. That is, when a side lobe of the transmitter points toward a propagation path direction, radiation from the side lobe arrives at the receiver, and thereby affecting the received-signal power (or other reception signal characteristics).

Figure 10:
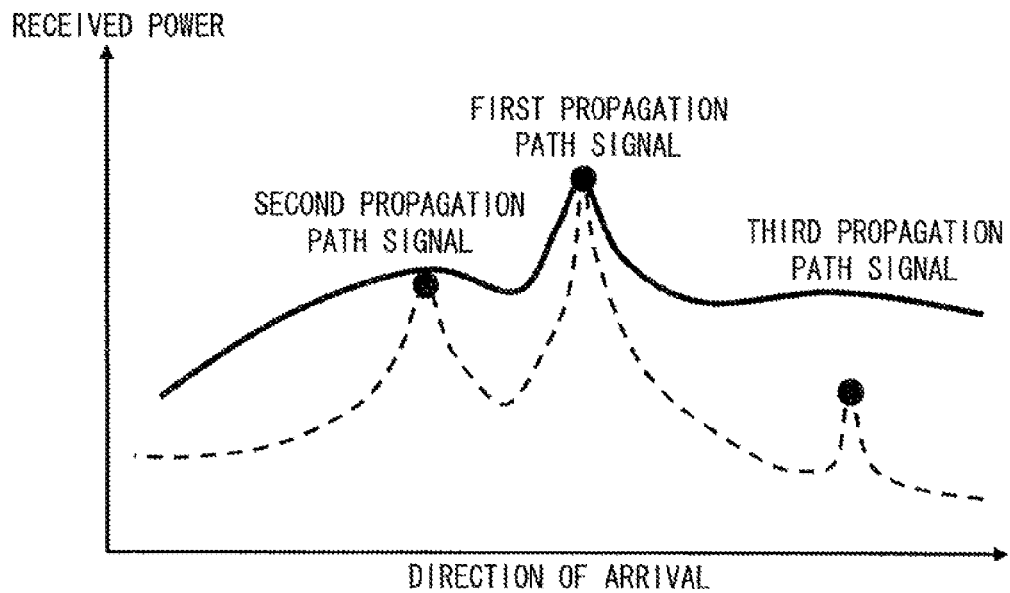
FIG. 10 is a schematic diagram for explaining a first influence exerted on an angle profile caused by the side lobe effects.

The effect of side lobe could affect the angle profile shown in FIG. 7 in two ways. The solid line in FIG. 10 schematically shows an aspect of a first effect. As shown in the graph, the angle profile could be blunted because the effect of a signal received by the side lobe could be piled up on the profile shown in FIG. 7 (which is illustrated by a broken line for comparison in FIG. 10). As a result, it could be very difficult to detect a relatively small peak in the received-signal power.

Figure 11:
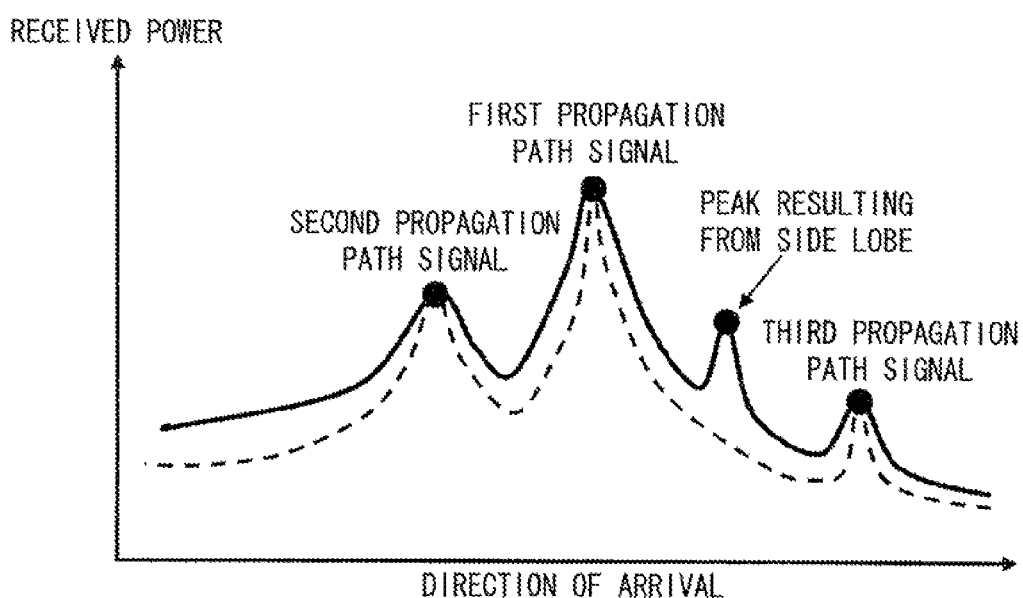
FIG. 11 is a schematic diagram for explaining a second influence exerted on an angle profile by the side lobe effects.

The solid line in FIG. 11 schematically shows an aspect of a second effect. Similarly to FIG. 10, the profile with no side lobe effect affecting thereon is shown by a broken line for comparison. There is a possibility that when a signal having a large power (typically, a signal propagating through a propagation path having a high priority as described above) is received by a side lobe having a relatively large electric field strength, a peak that is not generated by the main lobe appears as shown in this figure. The DOA corresponding to this peak is the direction to which the main lobe is pointed when the side lobe is receiving a large power signal and from which no actual signal arrives. Although it is possible to perform communication by using the side lobe instead of the main lobe by using the AWV setting of this state, the propagation path that is actually used is the propagation path through which the large power signal propagates (propagation path having a higher priority). Therefore, if the communication quality of the propagation path having the higher priority is deteriorated by shielding or the like, the communication quality in the AWV setting in which reception is performed by the side lobe will be also deteriorated at the same time. Therefore, the AWV setting in which reception is performed by the side lobe has a little value as a reserve AVW setting.

Two phenomena that could appear in the angle profile due to the side lobe effect have been described above. The degree of emergence of these phenomena depends on characteristics of the antenna array and the propagation environments. Note that the characteristics of the antenna array mean a level difference between the main lobe and the side lobe, and the like. The propagation environment means, for example, a fact that the above-mentioned phenomenon tends to appear when the LOS (Line of Sight) propagation path component is outstandingly strong (received power is large). In such a case, it is expected that the detection of other NLOS (Non Line of Sight) propagation path components becomes very difficult because of the blunted profile, and that the probability of peak appearances resulting from side lobes increases.

The procedures explained below are carried out to cope with the emergence of a peak resulting from a side lobe, among the above-described phenomena, when the peak emergence is noticeable.

In consideration of the above-described problem of the peak resulting from the side lobe, assume an angle profile shown by the solid line in FIG. 11 as an example. Note that the broken line in FIG. 11 is the ideal angle profile shown in FIG. 7. The process/arithmetic circuit 506 performs a peak search (four peaks in this example) using the data string of the obtained angle profile, and thereby obtains DOA and received-signal power for each peak.

While maintaining its AWV in the setting for generating an omni or quasi-omni pattern, the transceiver 400 transmits a training signal again or successively. This training signal arrives at the transceiver 500 through a plurality of propagation paths.

At this point, the transceiver 500 is operated for reception again or successively. Then, the transceiver 500 successively points a null point to one by one from the previously-obtained four DOAs and measures the received power of the signal in the transceiver 500 performing the receiving operation by operating its antenna array 511-1 to 510-L, receiver circuit 509, control circuit 513, and process/arithmetic circuit 506 in a connected manner and thereby changing the AWV of its antenna array. The null point means a direction in which the electric field strength becomes very small in the directional characteristic of the antenna array.

Next, the process/arithmetic circuit 506 calculates, for each of the four DOAs, a ratio between the received-signal power measured when the angle profile is obtained and the received-signal power measured when the null point is pointed for objective DOA. In this process, if a peak of DOA is formed by receiving the signal by the main beam, the received power changes widely when the signal is received with the null point. On the other hand, if a peak of DOA is formed by receiving a strong signal coming from a direction different from the main beam direction (direction recognized as the DOA in the angle profile) by a side lobe, the main beam that is originally pointed to a direction in which no signal path exists is replaced by the null point. Therefore, there is a high possibility that the change, in the received power becomes smaller compared to the above-described situation. Accordingly, an appropriate threshold is defined for the ratio between the received power measured when the angle profile is obtained and the received power measured when the null point is pointed. Then, if the ratio is lower than the threshold, it is determined that the peak is formed by receiving a signal coming from a direction different from the main beam direction by a side lobe.

Figure 12:
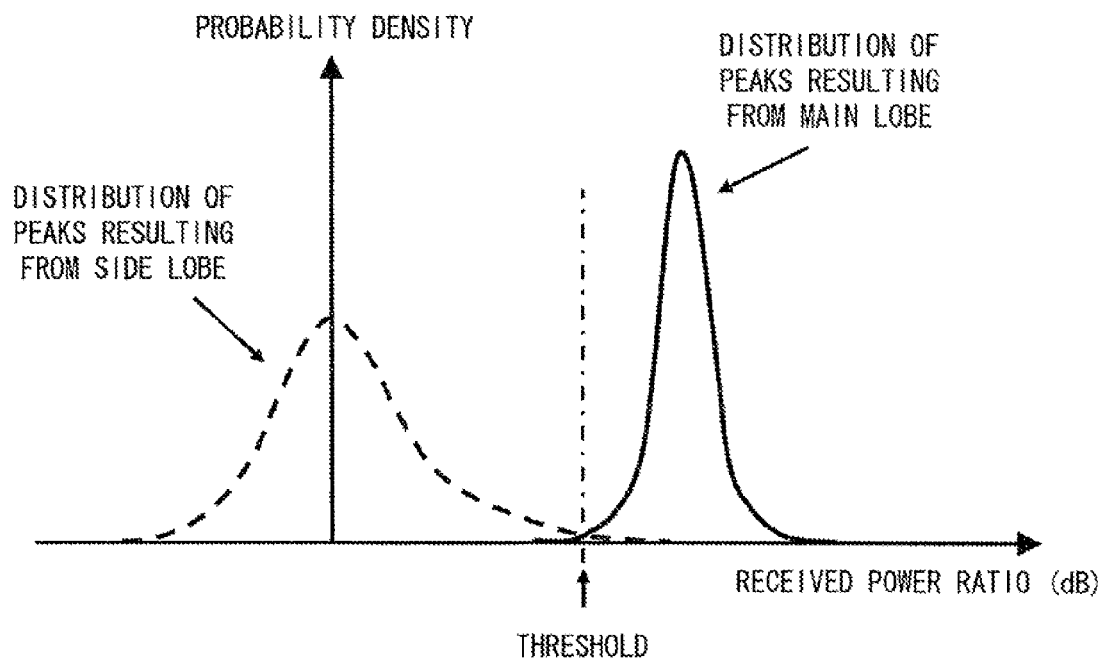
FIG. 12 is a schematic diagram showing a received power ratio of a training signal between before and after a null point direction is pointed to the DOA of the training signal.

In the above explanation about the process to point the null point to DOA, radiating pattern in directions other than the null point is not mentioned. In the AWV control to point the null point to DOA, when the condition that the null point is formed in that direction is used but no particular restriction is imposed on the radiating pattern in the directions other than the null point, the above-described ratio between the received-signal power measured when the angle profile is obtained and the received-signal power measured when the null point is pointed is expressed as a probability event, for example, as shown in FIG. 12. That is, when a peak in DOA is formed by receiving the signal by the main beam, it becomes a distribution having a relatively small variance with its expected value being the ratio between the main beam strength at the time of the angle profile creation and the null depth when the null point is pointed. On the other hand, when a peak in DOA is formed by receiving a strong signal coming from a direction different from the main beam direction, it becomes a distribution having a relatively large variance with its expected value being, for example, a value equal to or close to 0 dB. As described above, when no particular restriction is imposed on the radiating pattern in the directions other than the null point in the AWV control that is performed to point the null point to DOA, the received power ratio is expressed as a probability event shown in FIG. 12. However, by setting a threshold in advance at a value indicated by the chain line in the figure, it is possible to discriminate peaks resulting from side lobes with a high probability.

Note that it is possible to make the variance of the probability distribution shown in FIG. 12 smaller by performing the AWV control in such a manner that the directions other than the null point direction and its adjacent directions become an omni or quasi-omni pattern when the null point is pointed to DOA, and thereby to discriminate peaks resulting from side lobes with a higher accuracy.

Although the threshold is to be set in advance in the above explanation, the threshold may be determined, after the angle profile and/or the received power ratio are measured, with consideration given to data obtained in these measurements.

Next, the process/arithmetic circuit 506 eliminates any directions that have been determined to be resulting from side lobes (one direction in this example) from the originally-obtained DOAs (four directions in this example). Then, AWVs each of which is used to point the main beam or a beam close to the main beam (sub-beam) to a respective one of the remaining DOAs (three in this example) are calculated, and these calculated AWVs are stored into the storage circuit 508 in the order of the received-signal power measured when the angle profile is obtained. Further, in this process, both the AWVs for the AWV control circuits 510-1 to 510-L of the receiver 502 and the AWVs for the AWV control circuits 504-1 to 504-K of the transmitter 501 are calculated. When the transceiver 500 is operated for reception, the former is used, whereas when it is operated for transmission, the latter is used. Further, instead of using newly calculated AWVs, AWVs with which the main beam or a beam close to the main beam (sub-beam) is pointed toward the corresponding DOA among the AWVs that were used when the beam scan was performed may be used.

Figure 13:
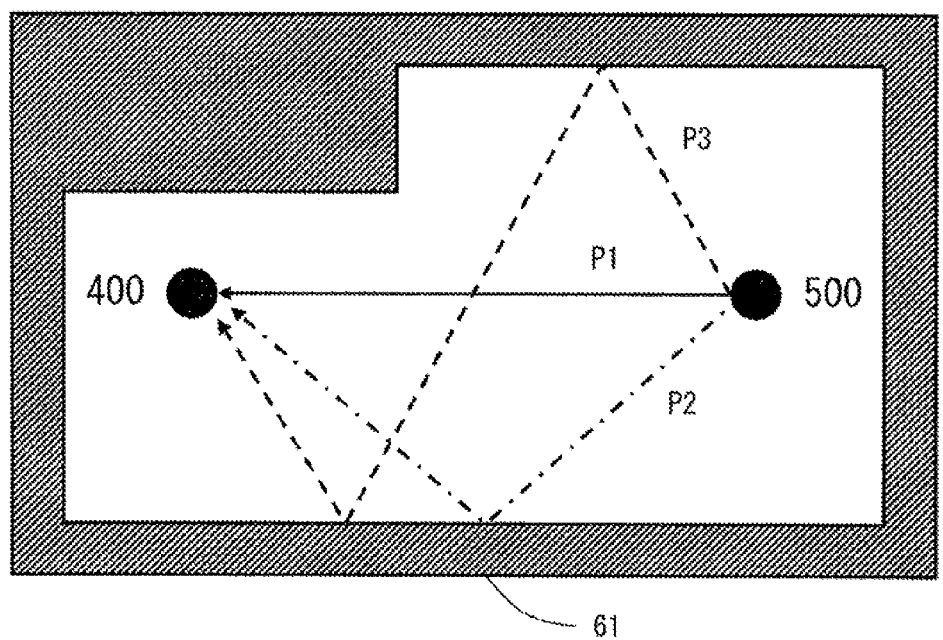
FIG. 13 is a plane view illustrating an example of propagation environment to which the present invention can be applied.

Next, the roles of the transceivers 400 and 500 are interchanged, and similar processes are performed. That is, the transceiver 500 is operated for transmission and its AWV is set so that an omni or quasi-omni pattern is generated. The transceiver 500 transmits a training signal in that state. The training signal arrives at the transceiver 400 through a plurality of propagation paths. Note that there are first to third propagation paths P1 to P3 as available paths for communication as shown in FIG. 13, and the directions of these propagation paths are opposite to those shown in FIG. 6.

Figure 14:
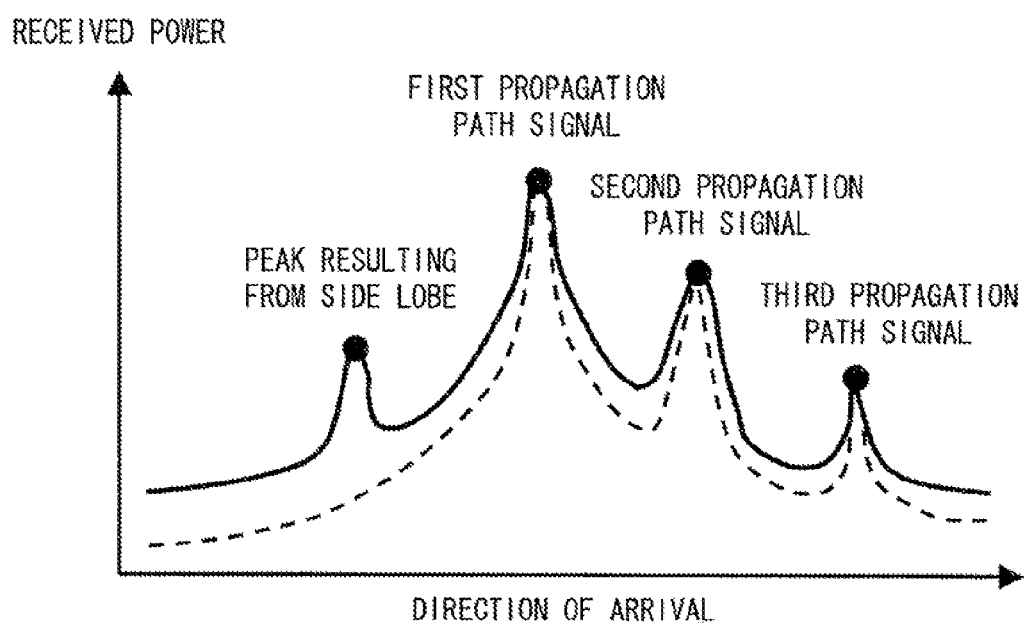
FIG. 14 is a schematic diagram showing an example of an angle profile obtained during control procedure according to an exemplary aspect of the present invention.

At this point, the transceiver 400 is operated for reception and performs main beam scanning by operating its antenna array (antenna elements 411-1 to 411-L), receiver circuit 409, control circuit 413, process/arithmetic circuit 406 in a connected manner. As a result, an angle profile shown by the solid-line in FIG. 14 can be obtained. Note that the broken line in FIG. 14 is an ideal angle profile that is not affected by the reception by side lobes at all. The process/arithmetic circuit 406 specifies DOAs by performing a peak search by using the angle profile. Next, a null point is successively pointed to one by one from the specified DOAs and the received power is measured.

The process/arithmetic circuit 406 calculates a ratio between the received power measured when the angle profile is obtained and the received power measured when the null point is pointed. Then, when the ratio is lower than the pre-defined threshold, the process/arithmetic circuit 406 determines that the peak is formed by receiving a signal coming from a direction different from the main beam direction by a side lobe. The process/arithmetic circuit 406 eliminates any directions that have been determined to be resulting from side lobes (one direction in this example) from the originally-obtained DOAs (four directions in this example). Then, AWVs each of which is used to point the main beam or a beam close to the main beam (sub-beam) to a respective one of the remaining DOAs (three in this example) are calculated, and these calculated AWVs are stored into the storage circuit 408 in the order of the received-signal power measured when the angle profile is obtained. Further, in this process, both the AWVs for the AWV control circuits 410-1 to 410-N of the receiver 402 and the AWVs for the AWV control circuits 404-1 to 404-M of the transmitter 401 are calculated. When the transceiver 400 is operated for reception, the former is used, whereas when it is operated for transmission, the latter is used. Further, instead of using newly calculated AWVs, AWVs with which the main beam or a beam close to the main beam (sub-beam) is pointed toward the corresponding DOA among the AWVs that were used when the beam scan was performed may be used.

Note that, in general, there is no clear relation between the DOAs of the horizontal axes in FIG. 11 and those in FIG. 14. However, since both the three signals shown in FIG. 6 and the corresponding three signals shown in FIG. 13 propagate through the same paths in the opposite directions, the propagation losses are substantially equal to each other. Therefore, the magnitude relation of their powers is often maintained. Note that in this example, an assumption is made that the distance between the transmission antenna array (antenna elements 405-1 to 405-M) and the reception antenna array (antenna elements 411-1 to 411-N) of the transceiver 400 is negligible since it is considerably smaller compared to the distance of the propagation path. Similarly, an assumption is also made that the distance between the transmission antenna array (antenna elements 505-1 to 505-K) and the reception antenna array (antenna elements 511-1 to 511-L) of the transceiver 500 is negligible since it is considerably smaller compared to the distance of the propagation path. These assumptions are sufficiently satisfied in ordinary propagation environments. Further, the present invention is also applicable to transceivers having such a configuration that a common antenna array is used for both transmission and reception. In such configurations, the above-described assumption is unnecessary.

Each of the transceivers 400 and 500 selects an AWV at the same ranks from the AWVs stored in the storage circuits 408 and 508 in the above-described method, and then starts communication (S13 and S14 in FIG. 1). At this point, when the transceiver 400 is operated for transmission, the AWV control circuits 404-1 to 404-M of the transmitter 401 should be set with an AWV at a predetermined rank among the AWVs stored in the storage circuit 408. When the transceiver 400 is operated for reception, the AWV control circuits 410-1 to 419-N of the receiver 402 should be set with an AWV at a predetermined rank among the AWVs stored in the storage circuit 408. A similar setting is made for the transceiver 500. Note that AWV combinations between two transceivers are determined based on the received-signal power order obtained at the time of training.

Then, if the communication using the AWV combination that is selected at the initial stage deteriorates, the transceivers 400 and 500 select another AWV combination at the same rank from the AWVs stored in the storage circuits 408 and 508 (S15 in FIG. 1), verifies the communication quality (S16 in FIG. 1), and adopts that candidate when the communication quality is satisfactory (transition from S13 to S14). In the above processes, the selection of AWVs may be performed, for example, in the order in which the AWVs are stored, i.e., in the order of the received-signal power obtained in the initial training.

Note that when the dependence of the antenna gain on the main beam direction (DOA) in the main beam scanning is too large to be ignored, a correction may be made to the above-mentioned angle profile by using the directional dependence of the antenna gain before carrying out the above-described operations.

Although the terms such as "data string" and "angle profile" are used in the above explanation, there are no particular restrictions on their aspects provided that they represent a relation between the DOA or DOD of the signal and the reception signal characteristic.

Figure 15A:
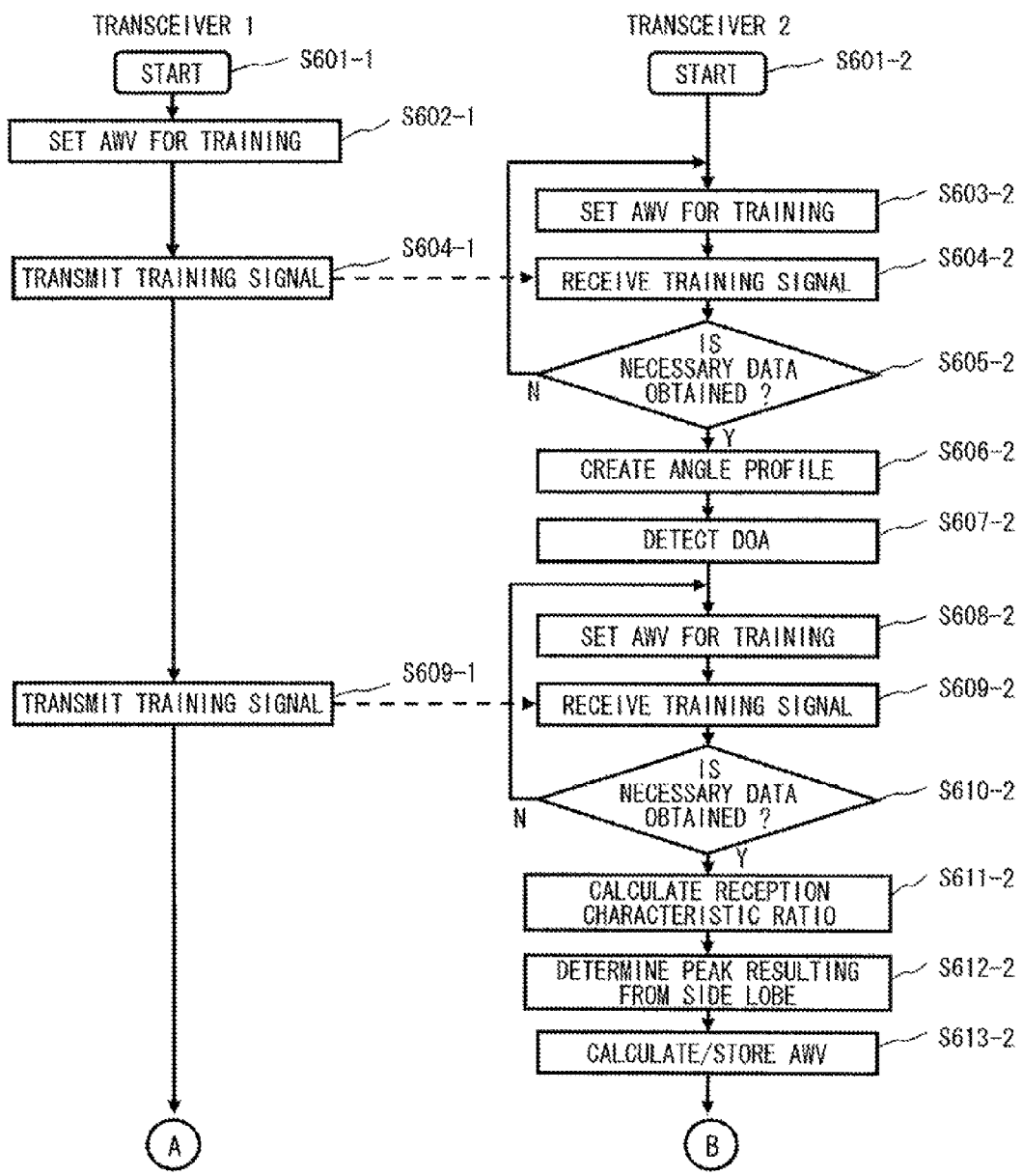
FIG. 15A is a sequence diagram illustrating operations of a transmitter and a receiver that are carried out before actual wireless communication in radio control procedure according to a first exemplary embodiment of the present invention.
Figure 15B:
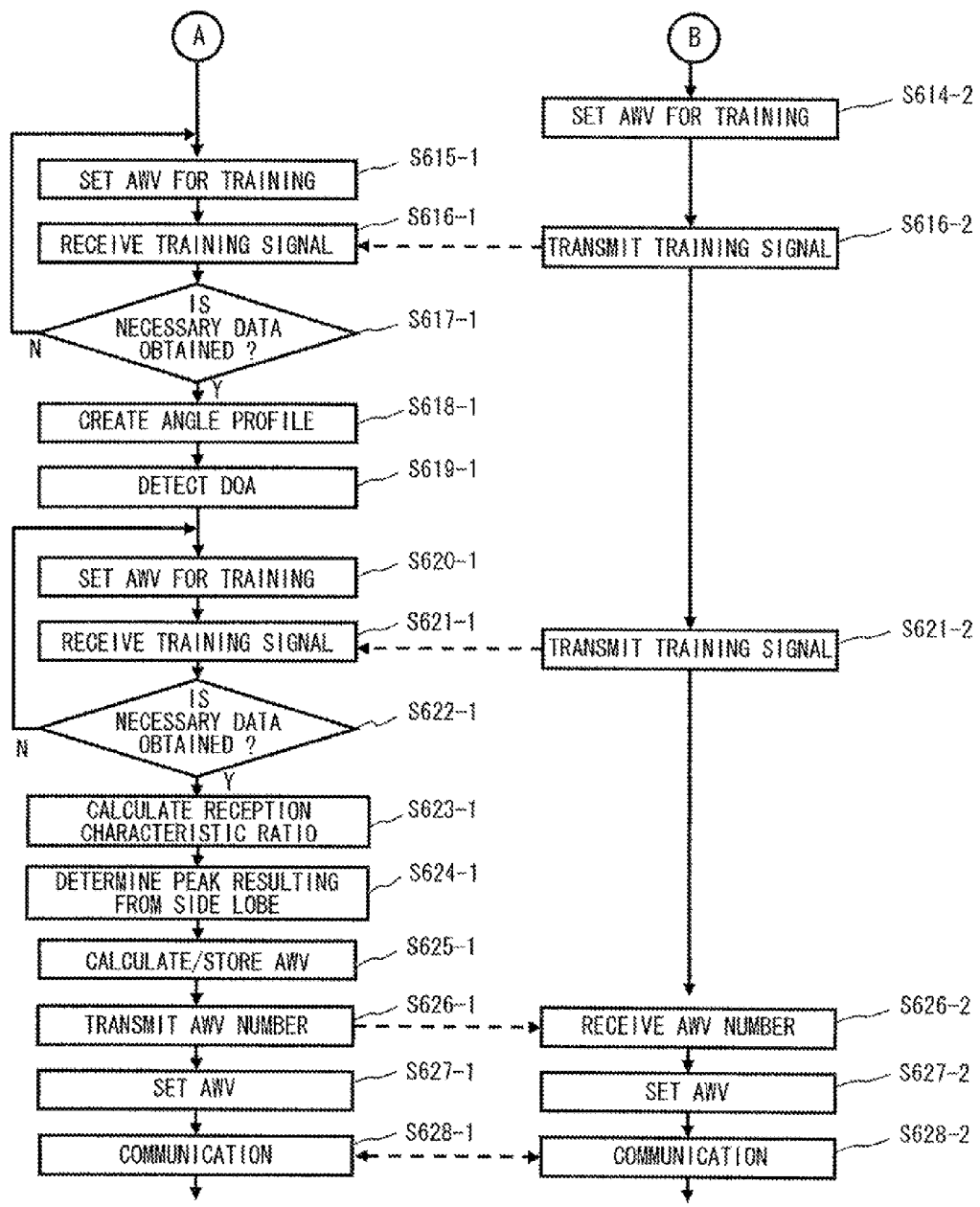
FIG. 15B is a sequence diagram illustrating operations of a transmitter and a receiver that are carried out before actual wireless communication in radio control procedure according to a first exemplary embodiment of the present invention.

Next, operations of the transceivers 400 and 500 performed in the state transition processes shown in FIG. 1 are explained hereinafter in detail. FIGS. 15A and 15B are sequence diagrams illustrating operations of the transceivers 400 and 500 in the transition processes from S11 to S13 in FIG. 1, i.e., the processes from the initial training to the start of actual communication. When the transceiver 400 is operated for transmission and the transceiver 500 is operated for reception, the transceiver 400 transmits external input data to the transceiver 500 in the normal communication. Meanwhile, in the training, the process/arithmetic circuit 406 instructs the transmitter circuit 403 to output a signal for training (hereinafter called "training signal"). As a result, in the training, a training signal is transmitted from the transceiver 400 to the transceiver 500. Similar operations are also performed in a reversed case, i.e., a case where the transceiver 400 is operated for reception and the transceiver 500 is operated for transmission. For the sake of simplicity, the transceivers 400 and 500 are represented as "transceiver 1" and "transceiver 2" respectively in FIGS. 15A, 15B, and FIGS. 16 to 19.

Hereinafter, each step in the sequence diagram shown in FIGS. 15A and 15B is explained one by one. Firstly, the transceiver 400 (the transceiver 1 in FIGS. 15A and 15B) sets an AWV to a value for training, i.e., a value for generating an omni or quasi-omni pattern (S602-1), and transmits a training signal (S604-1). The transceiver 500 (the transceiver 2 of FIGS. 15A and 15B) repeatedly receives the training signal (S604-2) while changing the AWV (S603-2) until the signal reception is completed for all the predetermined AWV settings (S605-2).

Then, the transceiver 500 creates an angle profile, which is a data string indicating a relation between received powers and DOAs of received signals, from the measurement result of the received signals (S606-2). Next, the transceiver 500 identifies signals by performing a peak search using the data string of the angle profile, and detects their DOAs (S607-2).

The transceiver 400 (transceiver 1 of FIGS. 15A and 15B) transmits a training signal successively or again (S609-1). The transceiver 500 (transceiver 2 of FIGS. 15A and 15B) successively points a null point to one by one from the DOAs detected in the step S607-2 by changing the AWV (S608-2), and thereby repeats the reception of the training signal (S609-2) until the receptions for all the DOAs are finished (S610-2).

Next, the transceiver 500 calculates a ratio (or other quantities indicating changes) between a reception characteristic measured in the step S604-2 and a reception characteristic measured in the step S609-2 for each DOA (S611-2). Next, any peak resulting from side lobes is determined by comparing the calculated ratios with a predefined threshold (S612-2). Next, the transceiver 500 calculates AWVs each having a main beam direction or a sub-beam direction close to the main beam pointing to a respective one of DOAs except for the DOA(s) that is determined to correspond to the peak resulting from side lobes, and stores these AWVs in the order of the received-signal power (S613-2).

Next, the roles of the transceivers 400 and 500 are interchanged, and similar procedures are performed. That is, the transceiver 500 sets an AWV to a value for training, i.e., a value for generating an omni or quasi-omni pattern (S614-2), and transmits a training signal (S616-2). The transceiver 400 repeatedly receives the training signal (S616-1) while changing the AWV (S615-1) until the signal reception is completed for all the predetermined AWV settings (S617-1). Then, the transceiver 400 creates an angle profile, which is a data string indicating a relation between received powers and DOAs of received signals, from the measurement result of the received signals (S618-1). Next, the transceiver 400 identifies signals by performing a peak search using the data string of the angle profile, and detects their DOAs (S619-1).

The transceiver 500 (transceiver 2 of FIGS. 15A and 15B) transmits a training signal successively or again (S621-2). The transceiver 400 (transceiver 1 of FIGS. 15A and 15B) successively points a null point to one by one from the DOAs detected in the step S619-1 by changing the AWV (S620-1), and thereby repeats the reception of the training signal (S621-1) until the receptions for all the DOAs are finished (S622-1).

Next, the transceiver 400 calculates ratios (or other quantities indicating changes) between reception characteristics measured in the step S616-1 and reception characteristics measured in the step S621-1 for each DOA (S623-1). Next, any peak resulting from side lobes is determined by comparing the calculated ratios with a predefined threshold (S624-1). Next, the transceiver 400 calculates AWVs each having a main beam direction or a sub-beam direction close to the main beam pointing to a respective one of DOAs except for the DOA(s) that is determined to correspond to the peak resulting from side lobes, and stores these AWVs in the order of the received power (S625-1).

As a preparation for starting communication, the transceiver 400 transmits an AWV number to be used (S626-1), and the transceiver 500 receives this number (S626-2). The AWV number represents the rank of AWV that are stored in accordance with the order of the received-signal power in the training. By using a combination of AWVs at the same ranks in the transceiver 400 and the transceiver 500, it is possible to form a beam that is pointed to a common propagation path. This AWV number may be transmitted in the opposite direction, i.e., from the transceiver 500 to the transceiver 400. This selection of the AWV number is preferably performed, for example, in the order of the storage, i.e., in the order of the received-signal power. Next, the transceivers 400 and 500 set their own AWV control circuits with AWVs corresponding to the AWV number (S627-1 and S627-2). With these processes, the transceivers 400 and 500 become ready for communication therebetween (S628-1 and S628-2).

Figure 16:
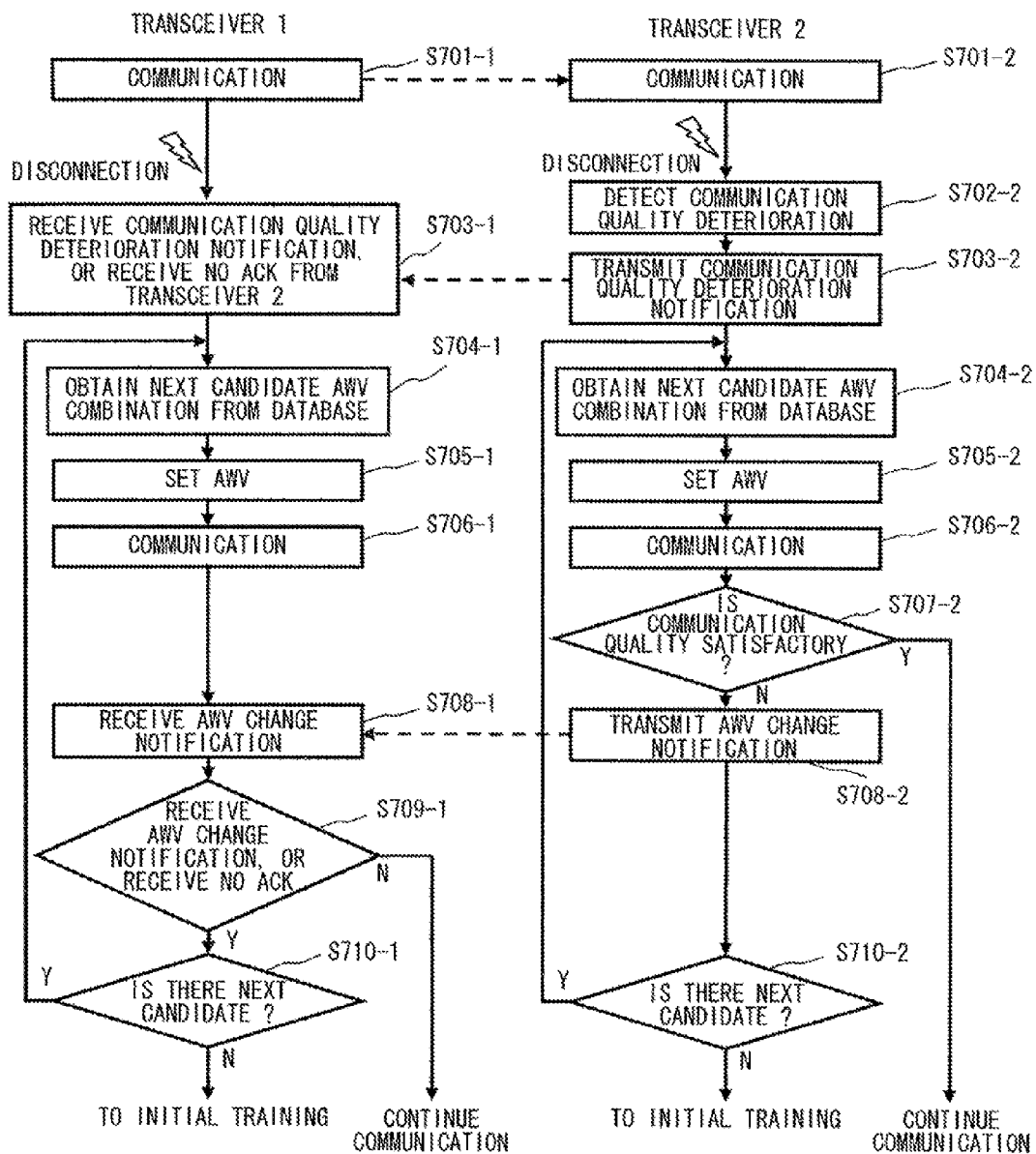
FIG. 16 is a sequence diagram illustrating operations of a transmitter and a receiver that are carried out when shielding of wireless communication occurs in radio control procedure according to a first exemplary embodiment of the present invention.

Next, an operation performed when deterioration in communication quality such as disconnected communication or the like occurs is explained with reference to FIG. 16. FIG. 16 is a sequence diagram showing operations of the transceivers 400 and 500 in the transition processes from S14 to S16 in FIG. 1. Note that in the following explanation, a case where the transceiver 400 (transceiver 1 in FIG. 16) is operated for transmission and the transceiver 500 (transceiver 2 in FIG. 16) is operated for reception is explained.

When a problem such as disconnected communication occurs, the transceiver 500, which is performing the receiving operation, detects the deterioration in communication quality (S702-2), and notifies the transceiver 400 of the deterioration (S703-2). The transceiver 400 receives the notification of the communication quality deterioration from the transceiver 500. Alternatively, the transceiver 400 recognizes the disconnected communication (or deteriorated communication state) based on the fact that the ACK signal, which would be otherwise transmitted from the transceiver 500 upon the successful data reception under normal communication circumstances, has not been received. At this point, each of the transceivers 400 and 500 obtains its next candidate AWV from its own database (S704-1 and S704-2).

In a step S705-1, the transceiver 400 sets the AWV control circuits 404-1 to 404-M with the next candidate AWV. Similarly, in a step S705-2, the transceiver 500 sets the AWV control circuits 510-1 to 510-L with the next candidate AWV. After that, the transceivers 400 and 500 resume the communication (S706-1 and S706-2). After the communication is resumed, the transceiver 500 examines the communication quality (S707-2). When the communication quality is satisfactory, the communication is continued, whereas when it is unsatisfactory, the transceiver 500 transmits a notification for AWV change (S708-2). The transceiver 400 continues the communication without making any change unless the transceiver 400 receives a notification for AWV change or cannot receive an ACK signal from the transceiver 500 (S709-1). If not so, the transceivers 400 and 500 attempt communication using a next candidate AWV combination as long as there is another candidate AWV combination (S710-1 and S710-2). If the communication quality cannot be improved with any of the candidate phase combinations stored in the storage devices 408 and 508 and there is no remaining candidate, the transceivers 400 and 500 returns to the initial training.

Incidentally, although the training in the transceiver 500 precedes the training in the transceiver 400 in die specific example shown in FIGS. 15A and 15B, the training in the transceiver 400 may be carried out before the training in the transceiver 500. Further, although the creation of an angle profile, the calculation of reception characteristic ratios, the determination of peaks resulting from side lobes, and the calculation/storage of AWVs are performed in their respective transceivers in the example shown in FIGS. 15A and 15B, it is possible to collectively perform all of these processes in either one of the transceivers. For example, data obtained in the training in the transceiver 500 may be transmitted to the transceiver 400 so that the creation of an angle profile, the calculation of reception characteristic ratios, the determination of peaks resulting from side lobes, and the calculation/storage of AWVs for the transceiver 500 can be performed in the process/arithmetic circuit 406 of the transceiver 400. In this case, AWVs themselves may be transmitted from the transceiver 400 to the transceiver 500, instead of transmitting the AWV number from the transceiver 400 to the transceiver 500 (S626-1). Further, when the database is created, AWV combinations that are obtained by a method other than the method specifically described in the specification of the present application may be added to the database. Such configurations may also fall within the scope of this exemplary embodiment.

According to this exemplary embodiment, when deterioration in communication quality such as disconnected wireless communication or the like occurs, communication can be swiftly resumed by selecting another candidate AWV combination that is generated in advance. In other words, it is unnecessary to carry out operations such as a training, acquisition of an angle profile, and generation of an AVW combination whenever deterioration in communication quality occurs in this exemplary embodiment, and thus making it possible to determine a new beam in an extremely short time. Further, according to this exemplary embodiment, it is also unnecessary to measure communication quality for every AWV combination between two communication devices when the above-mentioned candidate AWV combinations are generated, and thus making it possible to generate the candidate AWV combinations in a short time. Furthermore, according to this exemplary embodiment, it is possible to generate candidate AWV combinations with high accuracy even when peaks resulting from side lobes emerge in the angle profile due to the effect of the side lobes.

The following is supplementary explanation for the reason why this method, is effective for millimeter waves or microwaves that are higher than or equal to around 10 GHz and have a high rectilinear propagation property when the method is used indoors. The propagation paths that can be used for wireless communication are limited. That is, only the direct wave and reflected waves from certain objects such as walls, windows, and furniture can be used. Therefore, angles at which waves (signals) should be emitted for respective propagation paths or angles at which waves (signals) should be received are widely different from one wave (signal) to another. Meanwhile, when propagation paths having a low rectilinear propagation property such as a 2.4 GHz micro waveband are used, it is necessary to give consideration to effects caused by multiple scattering and diffraction. Therefore, in general, directional antennas are not used. Therefore, situations are different between communication using microwaves and millimeter waves that have higher than or equal to around 10 GHz and communication using microwaves in the order of 2.4 GHz. It should be noted that there are some examples of development of adaptive antennas having directivity for the purpose of eliminating interferences even in the field of communication using 2.4 GHz microwaves. However, even when an adaptive-type directional antenna is used, it is relatively easy to ensure satisfactory communication quality at the angle of the direct wave or angles close to the direct wave in the 2.4 GHz band because diffraction effects can be expected in the 2.4 GHz band.

In indoor communication using beam forming in millimeter wavebands, it is necessary to take the following properties into consideration. As described above, the number of reflected waves other than the direct wave is limited. Further, even if a certain direct wave or a reflected wave is blocked by an obstacle (e.g., human body), there is no correlation between the blocked certain wave and other waves. Therefore, as described with this exemplary embodiment, in millimeter wave communication systems, it is possible to secure reserve beam directions while performing communication in a beam direction having the best communication condition. Meanwhile, when the frequency is lower than around 10 GHz, contribution of multiple reflections and diffractions on the communication quality is large. Therefore, even if a directional antenna is used, the propagation state of the reserve beam directions varies depending on the presence/absence of an obstacle. That is, there is a high possibility that a received signal state of a reserve beam direction, which has satisfactory quality when no obstacle exists, is changed due to the presence of an obstacle. Therefore, it is difficult to obtain an advantageous effect of the present invention in 2.4 GHz microwave communication and the like.

Figure 20A:
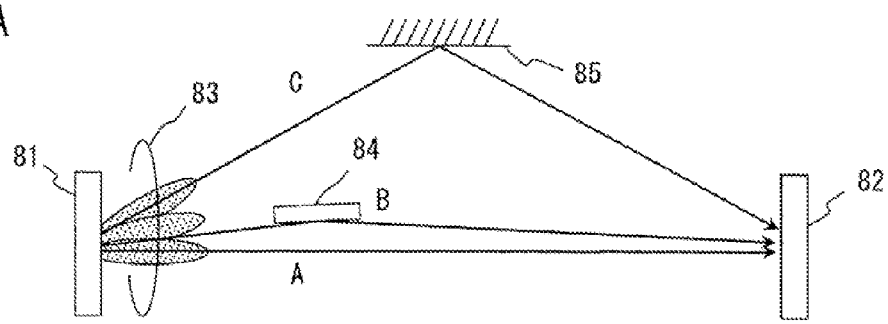
FIG. 20A is a figure for illustrating a radio wave propagation state where radio waves are not blocked and propagation paths are created as a result of local reflections of radio signals in radio control procedure according to a first exemplary embodiment of the present invention.
Figure 20B:
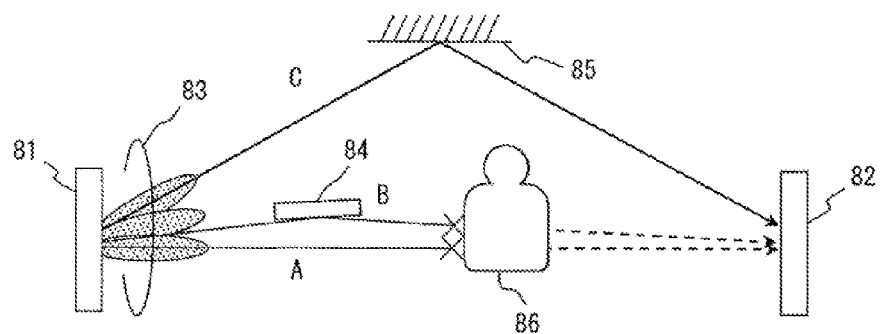
FIG. 20B is a figure for illustrating a radio wave propagation state where radio waves are blocked by a human body and propagation paths are created as a result of local reflections of radio signals in radio control procedure according to a first exemplary embodiment of the present invention.
Figure 21:
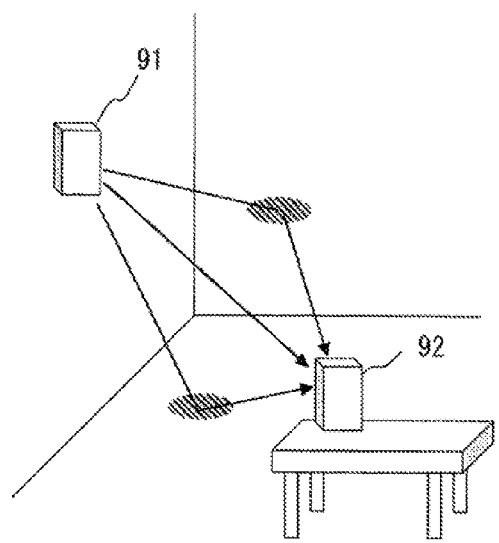
FIG. 21 shows a configuration of a system using wide-angle antennas.
Figure 22:
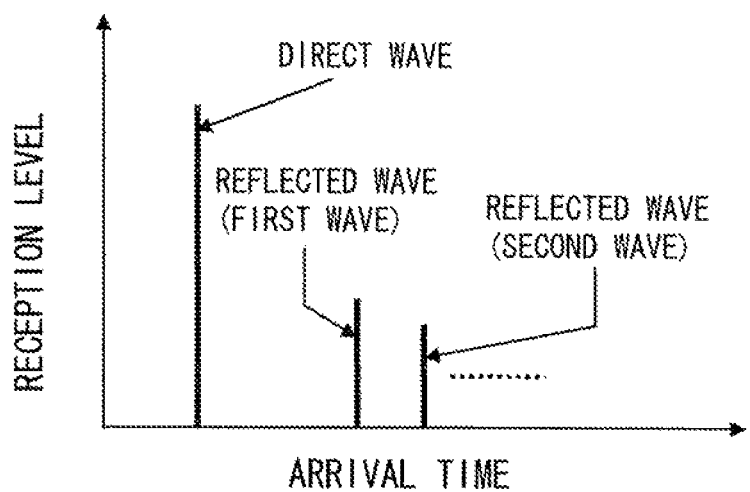
FIG. 22 shows an example of a delay profile of a system using wide-angle antennas when the system is used indoors.

Further, in millimeter wave communication, a local reflection may sometimes create a propagation path. FIGS. 20A and 20B show an aspect of such a situation. In FIG. 20A, there are a transceiver 81 and a receiver 82, and it is assumed that there are propagation paths in the beam forming including a direct wave A, a locally reflected wave B, and a reflected wave C propagating through a long path. There is a possibility that the direct wave A and the locally reflected wave B are blocked at the same time, for example, by a human body. To cope with this problem, Patent literature 1 discloses a technique including giving no or a low priority to a beam direction close to another beam direction to which a priority is already assigned. Although examples in which a priority order is assigned to AWV combinations in the order of received power has been described so far in the above explanation, it is also possible to take angular relations between candidate beams into account in addition to the criterion based on the received power in the assignment of the priority order. Since information about angular relations between candidate beams in the respective transceivers is already obtained in this exemplary embodiment, it is possible to perform the priority order assignment like this.

In the above explanation, AWV combinations that are to be set in the transceivers 400 and 500 are combined based on the order of the received power obtained in the initial training. However, in certain situations such as when two or more propagation paths have propagation losses close to each other, or when the quasi-omni pattern has poor accuracy, i.e., when there are variations among the antenna gains depending on the DOD, there is a possibility that an error occurs in the AWV combinations. Note that the "error" means such a situation that AWVs corresponding to different propagation paths are combined. However, even if such an error occurs, the quality examination is performed in the step S16 in FIG. 1. Therefore, when the above-described error in the combination occurs, the process changes to the state S15 to select another AWV combination again. Consequently, any critical situation such as long-time disconnection of communication and complete stop of communication is prevented. A different countermeasure against such AWV combination errors will be described later with a fifth exemplary embodiment.

In the above explanation, an AWV of the transceiver performing a transmitting operation is set in an omni or quasi-omni pattern. However, if it is very difficult to generate an omni or quasi-omni pattern, other fixed patterns may be used as a substitute. That is, a beam pattern in which the antenna gain of a fixed pattern beam has directional dependence may be also used. However, it is necessary to use a pattern having an antenna gain over a sufficiently wide angle range. In such a case, a process to remove the effects caused by the directional dependence of the antenna gain of the fixed pattern beam from the angle profile obtained by the above-described method should be added. Further, if necessary, a data string describing the directional dependence of the antenna gain of the fixed pattern beam may be transmitted/received between the transceivers.

In the above explanation, beam forming between two transceivers is explained. Such operations are often performed between two transceivers in a system including three or more transceivers. In general, there is a transceiver having special authority called "Piconet coordinator" or "access point" in the system. The decision on which two transceivers perform a beam forming operation therebetween among the three or more transceivers is typically made by instructions from this transceiver called "Piconet coordinator" or "access point". The Piconet coordinator or the access point may receive requests from other general transceivers and issue these instructions.

Further, in this exemplary embodiment, the roles of two transceivers 400 and 500 are interchanged and then similar processes are performed therebetween. Note that the decision on which of the two transceivers performs which of the roles before the other transceiver may be also made by instructions from the transceiver called "Piconet coordinator" or "access point".

Further, although expressions such as "to operate a transceiver for reception" and "to generate an omni (nondirectional) or quasi-omni (quasi-nondirectional) pattern" are used in the above explanation, these processes are typically performed in accordance with schedules that are incorporated in advance into the process/arithmetic circuits or the like of the respective transceivers.

<Second Exemplary Embodiment>

Figure 2:
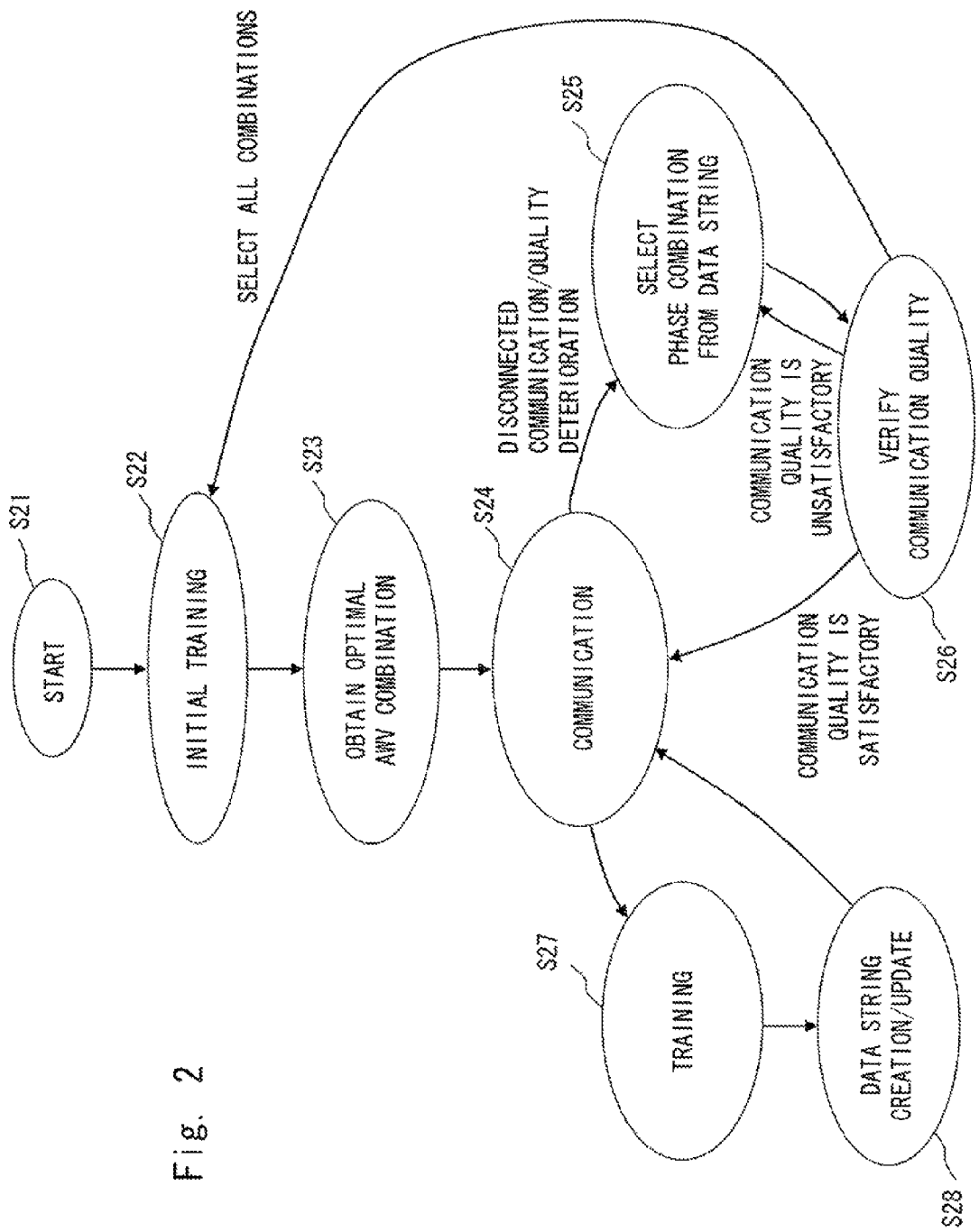
FIG. 2 shows transitions in radio control procedure according to a second exemplary embodiment of the present invention.

A second exemplary embodiment of the present invention is explained hereinafter with reference to a transition diagram shown in FIG. 2. It should be noted that a configuration similar to that shown in FIG. 5 can be used as the configuration of a wireless communication system in accordance with this exemplary embodiment. Each of states S21 to S26 and transition conditions therebetween in FIG. 2 are similar to S11 to S16 and their transition conditions shown in FIG. 1, which are described above with the first exemplary embodiment. Therefore, detailed explanation of S21 to S26 is omitted.

In S27 in FIG. 2, an additional second training is performed after transition from the state (S24) where the communication is continued. The second training may be periodically performed or may be performed during idle times in which there is no data to be transmitted/received.

In S28, the process/arithmetic circuit 406 and 506 calculate a plurality of candidate AWV combinations again. The process/arithmetic circuits 406 and 506 update the data strings stored in the storage circuits 408 and 508 with the plurality of candidate AWVs obtained by the recalculation.

In this exemplary embodiment, the situation regarding reserve beam directions is periodically or appropriately examined by the second training and the plurality of AWV combinations are thereby updated. In this way, the wireless communication system in accordance with this exemplary embodiment can ensure AWV combinations that are constantly updated to the newest state. Note that the second training (S27) may be divided and performed during intervals between the communication. In this way, it can eliminate the need to suspend the communication for a long time. Further, when the communication is disconnected or the communication quality is deteriorated, it is desired to recover the communication in an extremely short time. However, since this second training does not need to be performed immediately, it will not cause an problem even if a DOA estimation algorithm is performed.

Furthermore, since this second training often requires less immediacy in comparison to the initial training, the beam direction scanning, which is performed by changing the AWV of the antenna array, may be performed with a higher angular resolution. In this way, it is possible to find an AWV combination that makes it possible to achieve better communication quality.

Further, the beam direction scanning in the second training may be performed in such a manner that the scan range is limited within ranges close to the DOAs corresponding to the respective AWV combinations obtained in the initial training. In this way, the search for an AWV combination that makes it possible to achieve better communication quality can be performed in a shorter time.

<Third exemplary embodiment>

Figure 3:
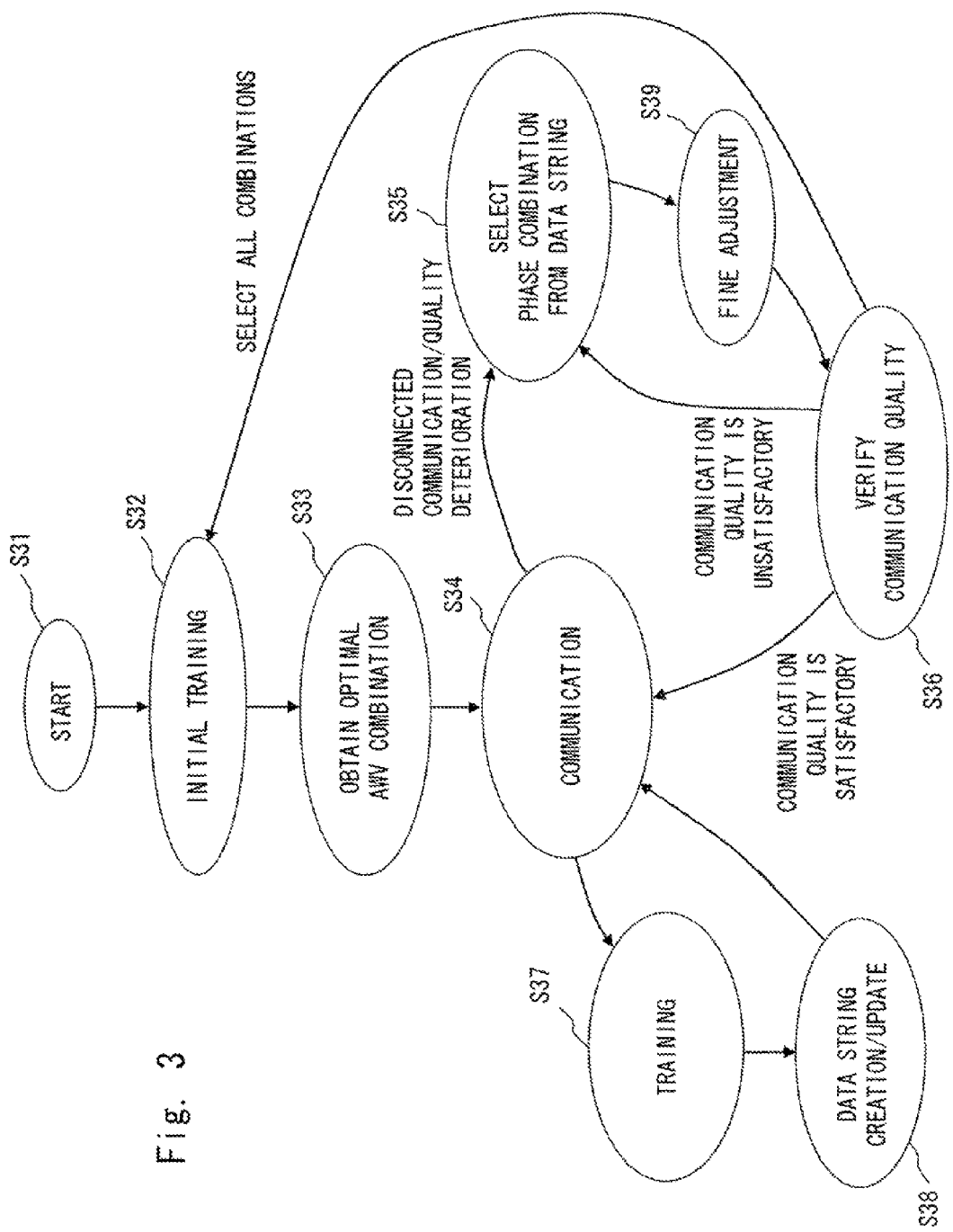
FIG. 3 shows transitions in radio control procedure according to a first exemplary embodiment of the present invention.
Figure 4:
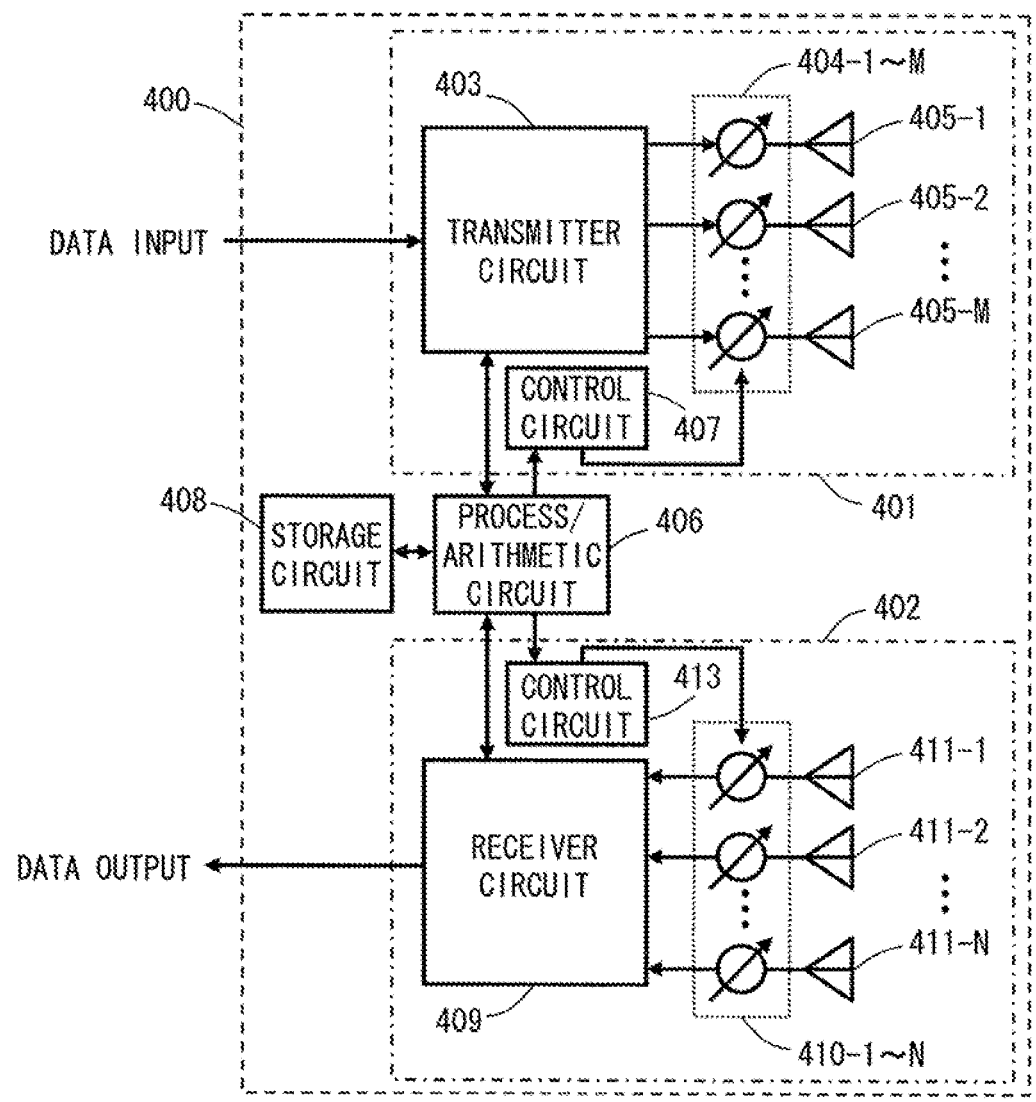
FIG. 4 shows an example of a configuration of an apparatus for use in beam forming to which the present invention is applicable.

A third exemplary embodiment of the present invention is explained hereinafter with reference to a transition diagram shown in FIG. 3. It should be noted that a configuration similar to the one shown in FIG. 5 can be used as the configuration of a wireless communication system in accordance with this exemplary embodiment. Further, the operations of the third exemplary embodiment are substantially the same as those of the second exemplary embodiment. That is, each of S31 to S38 and transition conditions therebetween in FIG. 3 are similar to S21 to S28 and their transition conditions shown in FIG. 2, which are described above with the second exemplary embodiment. Therefore, detailed explanation of S31 to S38 is omitted.

In this exemplary embodiment, when deterioration in communication quality such as disconnected communication or the like occurs, the next candidate AWV combination is selected from the AWV combinations recorded in the database (S35) and a fine adjustment is made in that state (S39). The "fine adjustment" means a method for searching for an optimal beam without spending too much time. Specifically, an adjustment may be performed by slightly changing the beam or the set AWV so that better communication quality is obtained. Further, simplified beam searching procedure such as "Beam Tracking" disclosed in Patent literature 4 may be applied. Furthermore, processes similar to those of the initial training may be performed with a higher angular resolution within ranges close to the DOAs corresponding to the newly selected AWV combinations.

For example, in a case where the AWV combination is to be shifted in order from an AWV combination corresponding to a larger received power to an AWV combination corresponding to a smaller received power as described in detail with the first exemplary embodiment, the received power becomes gradually smaller and therefore the accuracy could deteriorate. Accordingly, this exemplary embodiment provides an advantageous effect that, in a state where shielding occurs and the received power is thereby weakened, an AWV combination with which stable transmission can be achieved with a high accuracy can be found, for example, by performing a gain adjustment for the receiving operation and then performing a fine adjustment in the optimal state.

<Fourth Exemplary Embodiment>

A fourth exemplary embodiment is characterized in that the training and the acquirement/establishment of AWV combinations are performed at a low-rate (with a narrow band) and actual communication is performed at a relatively high-rate (with a wide band). The other operations may be performed by using the method in accordance with one of first to third exemplary embodiments.

In millimeter wave communication, since free space propagation losses are large, the received power is expected to be small. Therefore, if AWVs on the transmission side are set so as to generate an omni or quasi-omni pattern in the training, there is a possibility that a sufficient CNR (Carrier to Noise Ratio) is not achieved. Accordingly, it is expected that the use of the low-rate (narrow band) having better reception sensitivity provides advantageous effects such as making the training possible and improving the accuracy. It should be noted that the "use of low speed (narrow band)" means to narrow the frequency band used to transmit a training signal in order to narrow the noise bandwidth or to adopt a modulation technique having a small necessary CNR. Note that "to adopt a modulation technique having a small necessary CNR" means, in other words, to adopt a modulation technique in which the distance between signal points on the constellation is large (typically a smaller transmission speed). It should be noted that it is assumed that a narrow beam width is used in this exemplary embodiment. Therefore, there is no significant difference in optimal beam (AWV) combinations regardless of whether the transmission is preformed at a low-rate (narrow band) or at a high-rate (wide band) because the correlative bandwidth is wide.

<Fifth Exemplary Embodiment>

As stated in the last part of the explanation of the first exemplary embodiment, in a case where AWV combinations to be set in the transceivers 400 and 500 are made based on the order of received-signal power at the initial training, there is a possibility that an error occurs in the AWV combinations in certain situations such as when two or more propagation paths have propagation losses close to each other, or when the quasi-omni pattern has poor accuracy, i.e., when there are variations among the antenna gains depending on the DOD. Note that the "error" means a situation where AWVs corresponding to different propagation paths are combined. It is believed that the possibility of such errors depends on the propagation environment and the like. In any event, when errors occur with high frequency, it is desirable to apply procedure in accordance with this exemplary embodiment.

Figure 17A:
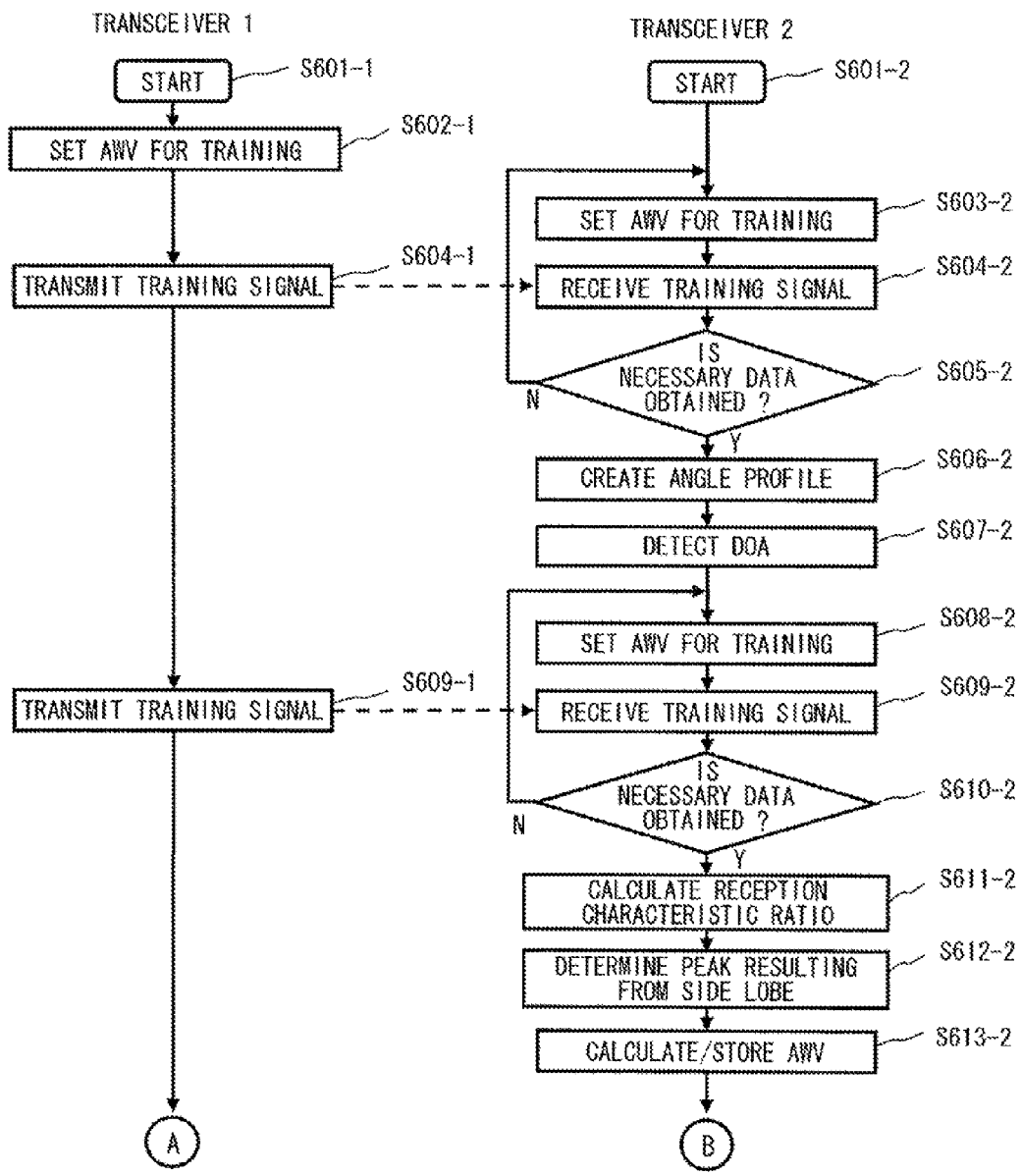
FIG. 17A is a sequence diagram illustrating operations of a transmitter and a receiver that are carried out before actual wireless communication in radio control procedure according to a fifth exemplary embodiment of the present invention.
Figure 17B:
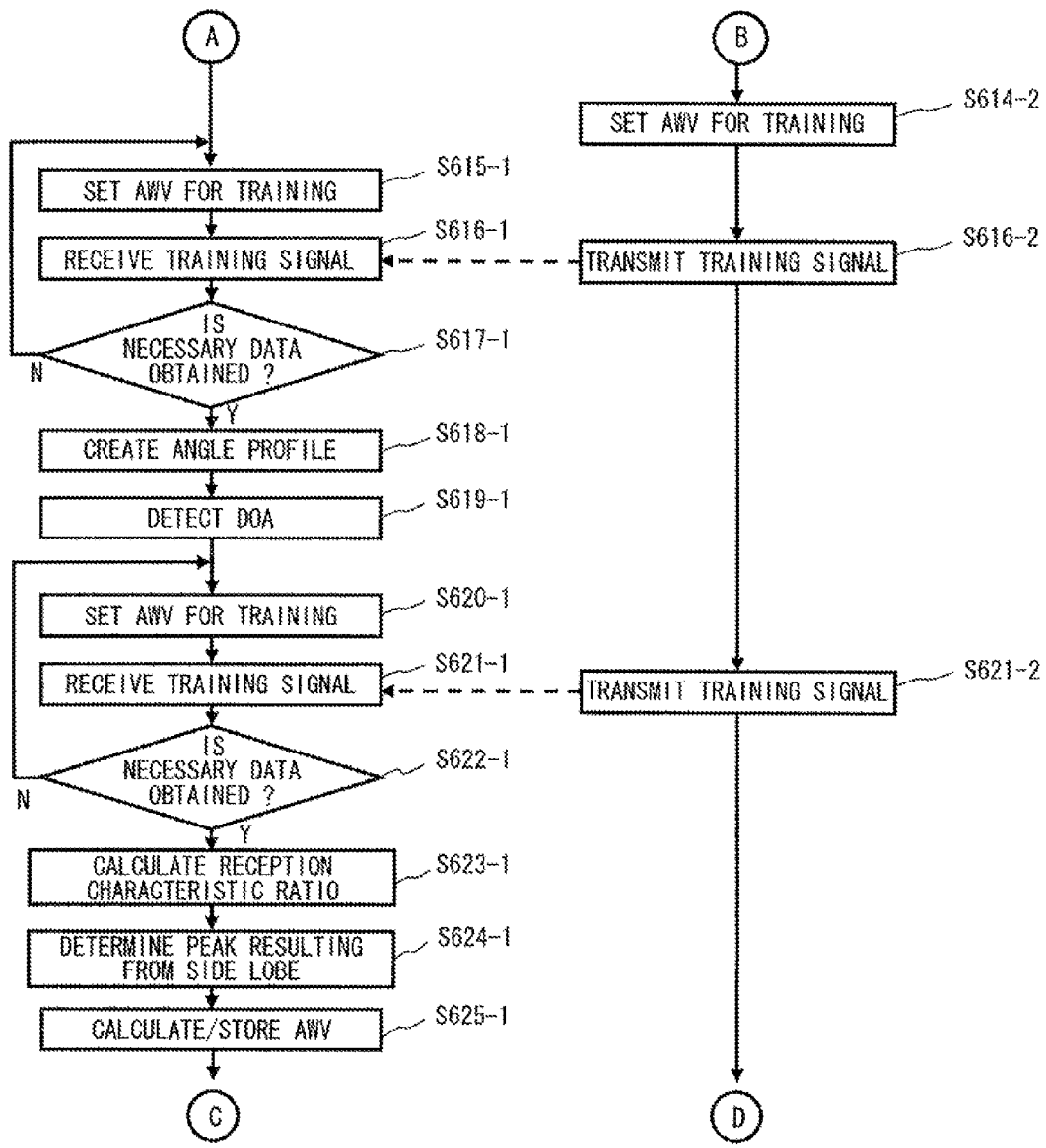
FIG. 17B is a sequence diagram illustrating operations of a transmitter and a receiver that are carried out before actual wireless communication in radio control procedure according to a fifth exemplary embodiment of the present invention.
Figure 17C:
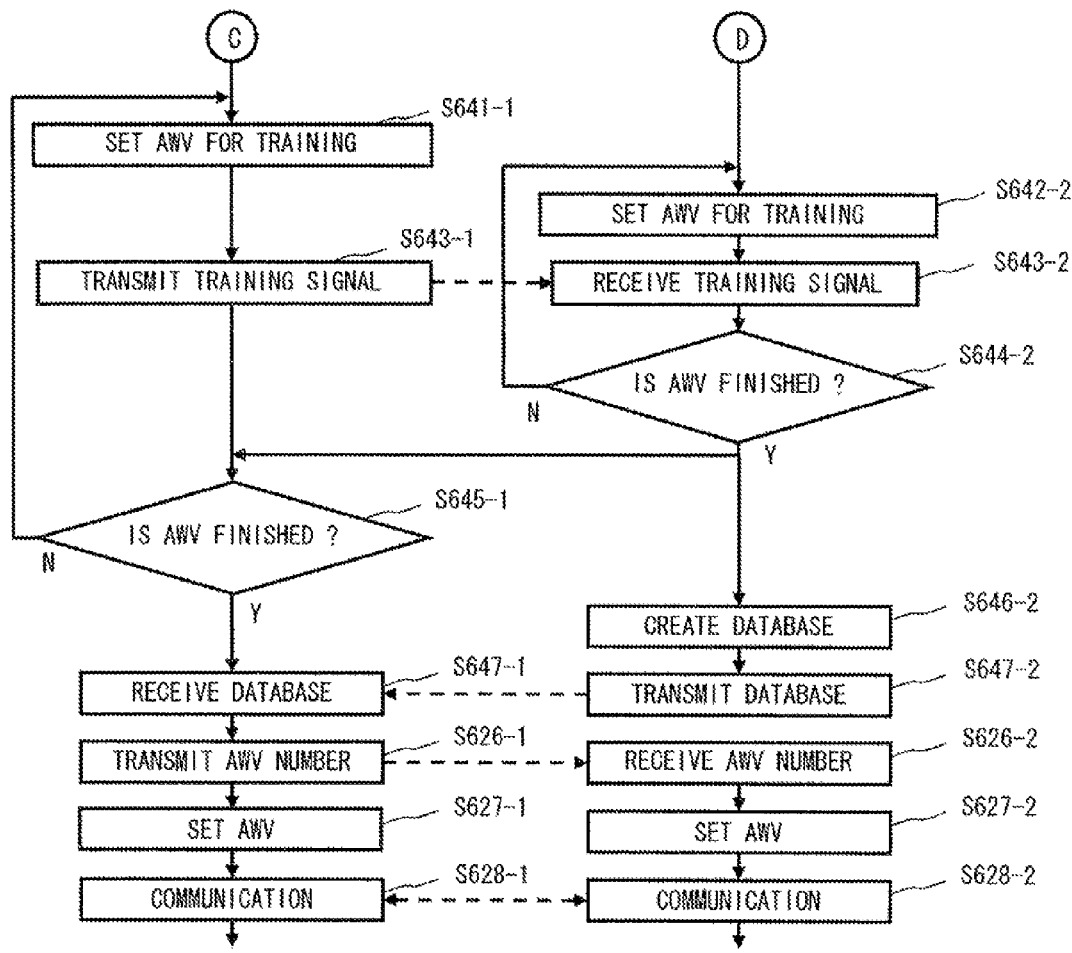
FIG. 17C is a sequence diagram illustrating operations of a transmitter and a receiver that are carried out before actual wireless communication in radio control procedure according to a fifth exemplary embodiment of the present invention.
Figure 18:
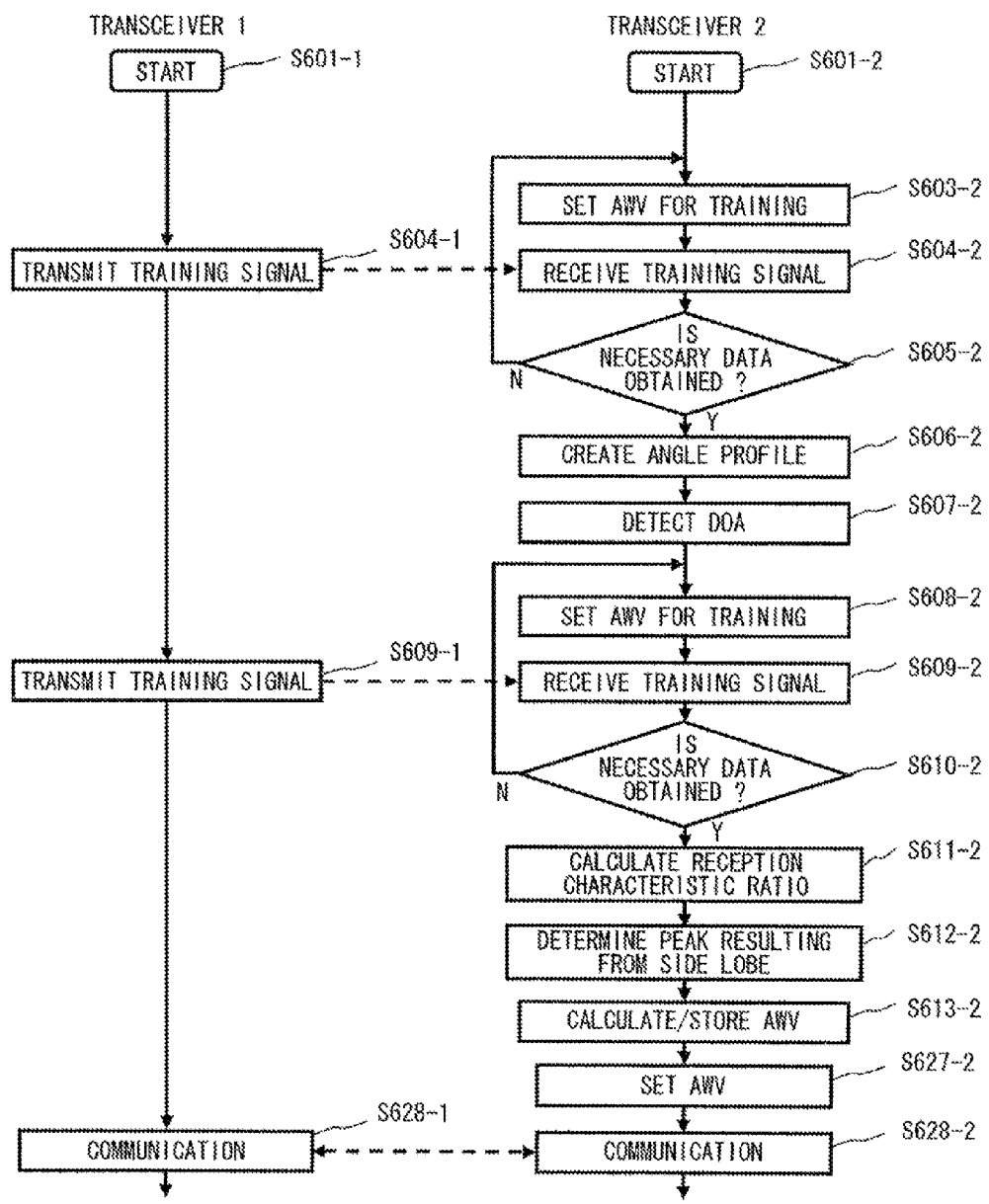
FIG. 18 is a sequence diagram illustrating operations of a transmitter and a receiver that are carried out before actual wireless communication in radio control procedure according to a sixth exemplary embodiment of the present invention.

This exemplary embodiment performs training for all the stored AWV combinations for both the transceiver 400 and the transceiver 500, instead of combining AWVs between the transceivers based on the order of the received-signal power at the initial training, and thereby secures AWV combinations having satisfactory communication quality. FIGS. 17A to 17C show an example of a sequence diagram.

FIGS. 17A to 17C are a modified version of the sequence diagram shown in FIGS. 15A and 15B, and have additional steps S641 to S647 between the steps S625 and S626 in FIG. 15B. In the steps S641-1, S643-1, and S645-1, the transceiver 400 sets a plurality of AWVs stored in the storage circuit 408 one by one and transmits a training signal in each setting. In the steps S642-2 to S644-2, the transceiver 500 performs a reception operation of the training signal transmitted from the transceiver 400 while setting all the AWVs stored in the storage circuit 508 one by one. After the transmission/reception of the training signal for all the AWV combinations has been completed, the transceiver 500 determines an AWV for reception having the best communication quality for each AWV for transmission used in the transceiver 400. Then, the transceiver 500 creates a data string (database) indicating AWV combinations having satisfactory communication quality (S646-2), and transmits the data string (database) indicating the AWV combinations to the transceiver 400 (S647-2). The transceiver 400 updates the AWV information stored in the storage circuit 408 by using the database received from the transceiver 500 (S647-1).

In general, it is unrealistic to measure communication quality for all the AWV combinations among a plurality of transceivers in terms of processing time. However, since the number of candidate AWVs is reduced to a small number through the processes up to S625-1 in this exemplary embodiment, the processing time required to measure communication quality for all the combinations can be reduced. Three propagation paths have been examined in each of the two-dimensional propagation environments explained above with FIGS. 6 and 13. It is expected that the number of propagation paths available for communicant in an actual three-dimensional millimeter wave propagation environment is limited to a small number. For example, even in a case where there are seven propagation paths, the number of all the AWV combinations is 49 at the most.

Further, the above-described procedure to measure communication quality for all the AWV combinations may be modified as shown below in order to reduce the processing time. Firstly, AWV combinations to be set in the transceivers 400 and 500 are determined based on the order of the received power at the initial training or the order of other communication quality in accordance with procedure described above with the first exemplary embodiment. Next, a communication quality test is carried out for these AWV combinations, and only the AWV combinations that do not satisfy a predetermined communication quality criterion are temporarily cancelled. Then, for the AWV combinations that are cancelled because their communication quality is lower than the communication quality criterion, a search for a new AWV combination is performed by carrying out a communication quality test for all the combinations. After that, the priority order of AWV combinations may be determined again based on the above-described two communication quality tests. By employing the method like this, among the AWV combinations that are determined based on the initial training result, the available AVW combinations can be excluded from the AWV combinations for which the round-robin-based communication quality measurement is performed to find new combinations, and thus making it possible to reduce the processing time.

<Sixth Exemplary Embodiment>

In the above explanation, it is assumed that communication is performed between transceivers that form a directional beam by beam forming. However, the present invention is also applicable to communication between a transceiver that forms a fixed beam and a transceiver that forms a directional beam by beam forming. Assuming a case where the transceiver 400 is a transceiver that forms a fixed beam and the transceiver 500 is a transceiver that forms a directional beam by beam forming, the training needs to be performed only for the transceiver 500 in this case. Therefore, the sequence diagram becomes, for example, the one shown in FIG. 18.

<Seventh Exemplary Embodiment>

Figure 19A:
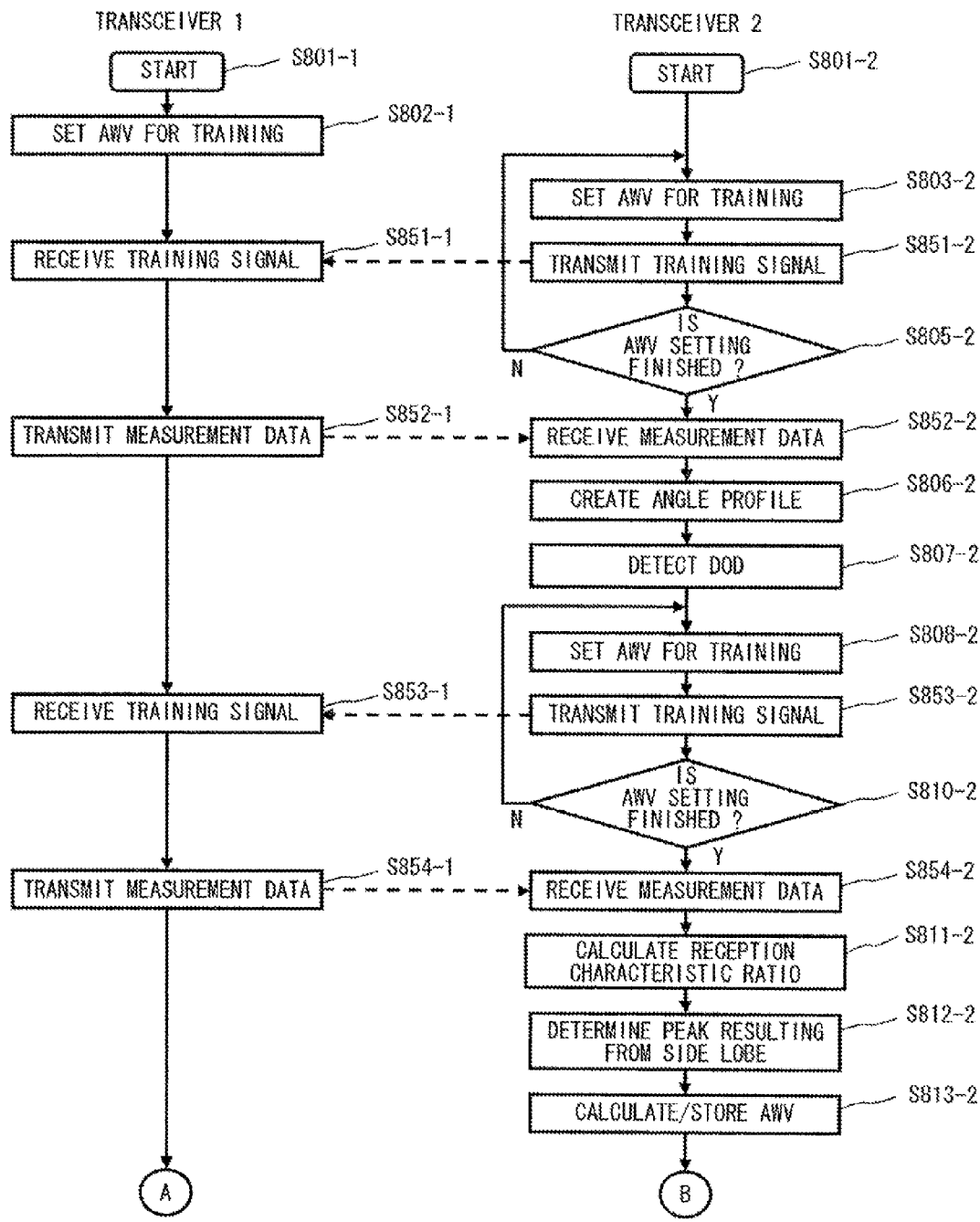
FIG. 19A is a sequence diagram illustrating operations of a transmitter and a receiver that are carried out before actual wireless communication in radio control procedure according to a seventh exemplary embodiment of the present invention.
Figure 19B:
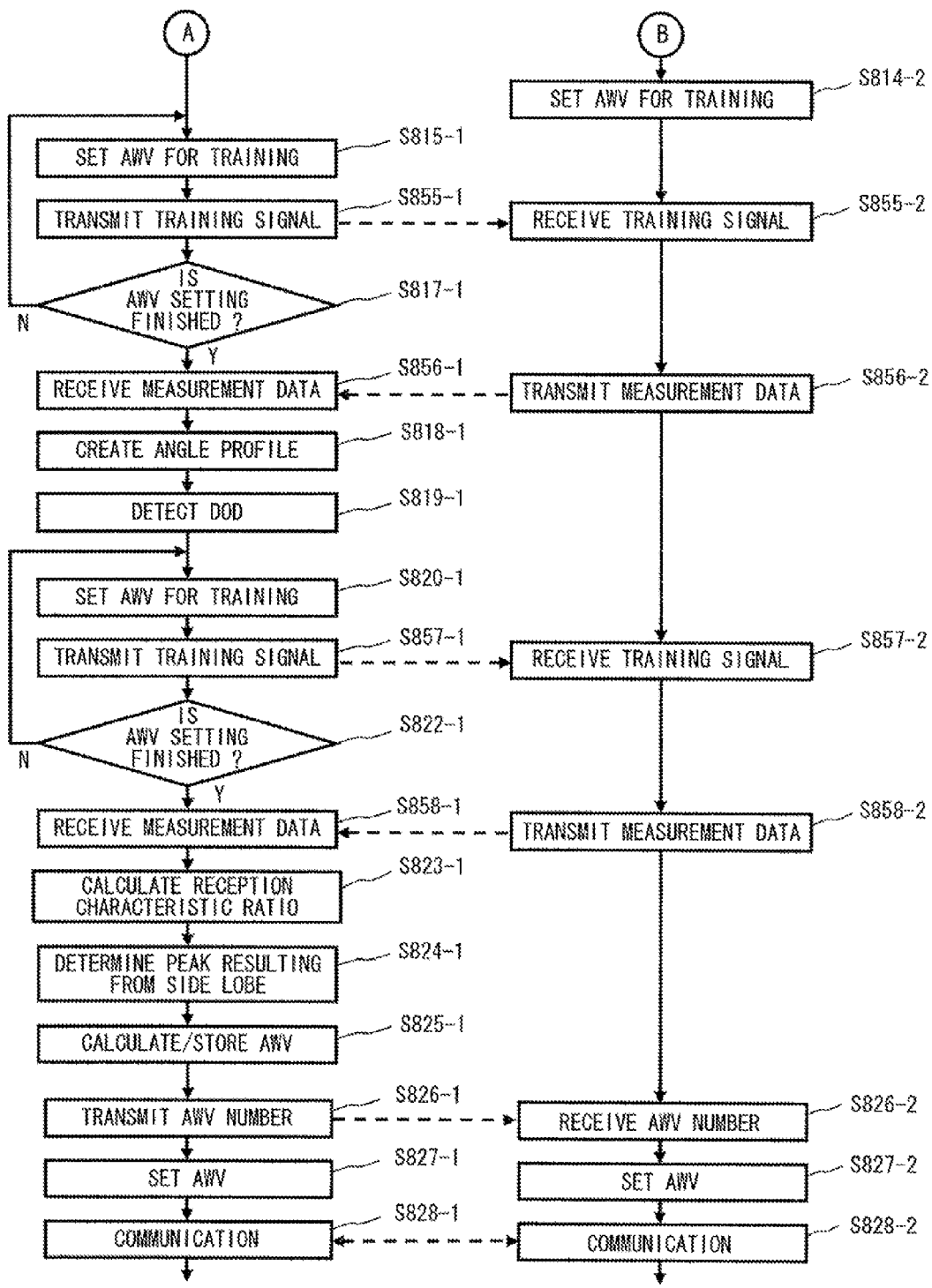
FIG. 19B is a sequence diagram illustrating operations of a transmitter and a receiver that are carried out before actual wireless communication in radio control procedure according to a seventh exemplary embodiment of the present invention.

In the above exemplary embodiments, an angle profile is created in the initial training by transmitting training signals from one transceiver that generates a quasi-omni pattern and measuring received signals in the other transceiver while changing the AWV. However, it is also possible to create an angle profile by changing the AWV of one transceiver that transmits training signals while measuring received signals in the other transceiver that generates a quasi-omni pattern, and then feeding back the measured data to the former transceiver. FIGS. 19A and 19B show an example of a sequence diagram in a case like this.

In this case, the angle profile becomes a data string indicating a relation between DODs and received powers of signals. Further, processes to transmit received measurement data to the transceiver performing the training (S852-1, S852-2, S854-1, S854-2, S856-1, S856-2, S858-1, and S858-2) are incorporated.

<Eighth Exemplary Embodiment>

In the first exemplary embodiment, an assumption is made that the distance between the transmission antenna array (antenna elements 405-1 to 405-M) and the reception antenna array (antenna elements 411-1 to 411-N) of the transceiver 400 is negligible since it is considerably smaller than the distances of the propagation paths. Similarly, an assumption is also made that the distance between the transmission antenna array (antenna elements 505-1 to 505-K) and the reception antenna array (antenna elements 511-1 to 511-L) of the transceiver 500 is negligible since it is considerably smaller than the distances of the propagation paths. However, these assumptions on the distance between the transmission/reception antennas are unnecessary when the following procedure is performed:

(a) Operating one of the transceivers (e.g., transceiver 400) for transmission, and transmitting a training signal in a quasi-omni pattern set in its antenna array;

(b) Operating the other transceiver (e.g., transceiver 500) for reception, and scanning a beam direction by changing the AWV of its antenna array;

(c) Obtaining a data string describing a relation between DOAs and reception signal characteristics in the transceiver 500 based on the reception result of the training signal in the transceiver 500, and thereby determining a plurality of DOAs;

(d) Receiving, in the transceiver 500 which is operated for reception in the step (b), the training signal while successively pointing a null point to one by one from the DOAs detected in the step (c) by changing the AWV of the antenna array of the transceiver 500;

(e) Calculating, for each DOA, a reception signal characteristic ratio between the steps (c) and (d), and eliminating any DOA(s) for which the ratio is lower than a predefined threshold;

(f) Operating the transceiver 500 for reception, and setting a quasi-omni pattern in its antenna array;

(g) Operating the transceiver 400 for transmission, and scanning a beam direction by changing the AWV of its antenna array;

(h) Obtaining a data string describing a relation between DODs in the transceiver 400 performing the transmitting operation and reception signal characteristics in the opposed transceiver 500 performing the receiving operation by feeding back the reception result of the training signal in the transceiver 500 to the transceiver 400, and thereby determining a plurality of DODs;

(i) Radiating, from the transceiver 400 which is operated for transmission in the step (g), the training signal while successively pointing a null point to one by one from the DODs detected in the step (h) by changing the AWV of the antenna array of the transceiver 400, and feeding back a reception result of the training signal in the transceiver 500 performing the receiving operation to the transceiver 400 performing the transmitting operation; and (j) Calculating, for each DOD, a reception signal characteristic ratio between the steps (h) and (j), and eliminating any DOD(s) for which the ratio is lower than a predefined threshold.

By using the above-described result, it is possible to obtain candidate AWV combinations for the transmitter of the transceiver 400 and the receiver of the transceiver 500. By performing the processes from (a) to (j) for the receiver of the transceiver 400 and the transmitter of the transceiver 500, it is possible to obtain AWV combinations for the receiver of the transceiver 400 and the transmitter of the transceiver 500.

Incidentally, the term "communication quality" has been used in the above-described eight exemplary embodiments. The communication quality may be any value representing communication quality such as a received-signal level, a signal to noise ratio (SNR), a bit error rate (BER), a packet error rate (PER), and a frame error rate (FER), and one or more than one of them may be used. Further, a certain data string in a preamble contained in a transmission data string of the transmitter 401 or transmitter 501 may be used for the communication quality evaluation.

Furthermore, controls and arithmetic operations for the generation/switching of candidate AWVs that are performed in the transceivers 400 and 500 in the above-described first to eighth exemplary embodiments can be implemented by executing computer programs for transmitter/receiver controls in computers such as microprocessors.

The program can be stored in various types of non transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

For example, in the case of the first exemplary embodiment, the steps S602-1 to S627-1 in FIGS. 15A and 15B, and the steps S703-1 to S705-1 and S708-1 to S710-1 in FIG. 16 may be performed by a computer that executes the transmitter/receiver control program. Similarly, controls and arithmetic operations for the generation/switching of candidate AWVs that are performed in the transceiver 500 can be also implemented by executing computer programs for transmitter/receiver controls in computers such as microprocessors. For example, in the case of the first exemplary embodiment, the steps S603-2 to S627-2 in FIGS. 15A and 15B, and the steps S702-2 to S705-2 and S707-2 to S710-2 in FIG. 16 may be performed by a computer that executes the transmitter/receiver control program.

Further, in addition to the process/arithmetic circuits 406 and 506, parts of the transmitter circuits 403 and 503 (e.g., modulation process), parts of the receiver circuits 409 and 509 (e.g. demodulation process), digital signal processes of the control circuits 407 and 507 and the like, and other components relating to equipment controls may be implemented by a computer such as a microcomputer and a DSP (Digital Signal Processor). Furthermore, the so-called "software-antenna technology" may be applied to the transceivers 400 and 500. Specifically, the AWV control circuits 404-1 to 404-M, 410-1 to 410-N, 504-1 to 504-K, and 510-1 to 510-L may be constructed by digital filters, or a computer such as a DSP.

In the above explanation, situations where communication is performed between two transceivers are explained as examples. However, the present invention is applicable to other situations where three or more transceivers perform communication.

In the above explanation, the operation for the main beam direction and the creation of an angle profile and the like are implemented in a transceiver performing a receiving operation while a transceiver performing a transmitting operation generates a quasi-omni pattern. However, when the quasi-omni pattern generated in the transceiver cannot cover a sufficient directional range, the above-described procedure may be divided and performed at multiple stages. That is, after an angle profile is obtained by generating a certain quasi-omni pattern, another quasi-omni pattern covering a different directional range is generated and an angle profile is obtained again. Finally, the signal may be specified by using a plurality of obtained angle profiles. Note that the "sufficient directional range" means a directional range covering all the propagation paths used in the communication. Non-patent literature 5 discloses a method for covering a necessary angular range with a plurality of quasi-omni patterns in a manner like that.

Note that the invention disclosed in Japanese Patent Application No. 2008-240156 (filed on Sep. 19, 2008) provides means to determine an AWV with ease in a short time under a propagation environment, or with the use of an antenna array, where the above-described side lobe effect does not pose any substantial problem. In contrast to this, although the invention disclosed in Japanese Patent Application No. 2008-282697 (filed on Nov. 4, 2008) may require more complex procedure and longer processing time in comparison to those of Japanese Patent Application No. 2008-240156, it can provide means to determine an AWV with high accuracy even under condition that there are two problems resulting from side lobes (i.e., blunting of angle profiles and emergence of peaks resulting from side lobes). In contrast to this, the invention in accordance with each of the above-described exemplary embodiments can provide means to determine an AWV more easily and more quickly in comparison to that of Japanese Patent Application No. 2008-282697 under condition that only the emergence of peaks resulting from side lobes causes a problem among the two problems resulting from side lobes. Therefore, these three inventions do not conflict with each other, but should be selectively used according to the conditions.

Although the present invention has been explained above with reference to certain exemplary embodiments, the present invention is not limited to the above-described exemplary embodiments. Various modifications that can be understood by those skilled in the art can be made to the configurations and the details of the present invention without departing from the scope of the present invention. The present invention is not limited to the above-described exemplary embodiments, and widely applicable to other embodiments to determine an AWV to be used in communication based on transmission/reception result of a training signal in wireless communication devices that perform beam forming like the ones disclosed in Patent literatures 4 and Non-patent literature 5.

This application is based upon and claims the benefit of priority from Japanese patent application No. 2009-137132, filed on Jun. 8, 2009, the disclosure of which is incorporated herein in its entirety by reference.

Industrial Applicability

The present invention is applicable to systems that perform wireless communication by adaptively controlling radio beams, and their control methods.

Reference Signs List
400, 500 TRANSCEIVER
401, 801, 81, 91 TRANSMITTER
402, 502, 82, 92 RECEIVER
403, 503 TRANSMITTER CIRCUIT
404-1 to 404-M, 504-1 TO 504-K AWV (ARRAY WEIGHT VECTOR) CONTROL CIRCUIT
405-1 to 405-M, 505-1 TO 505-K ANTENNA ELEMENT (TRANSMITTING ANTENNA ARRAY)
406, 506 PROCESS/ARITHMETIC CIRCUIT
407, 507 CONTROL CIRCUIT
408, 508 STORAGE CIRCUIT
409, 509 RECEIVER CIRCUIT
410-1 to 410-N, 510-1 TO 510-L AWV (ARRAY WEIGHT VECTOR) CONTROL CIRCUIT
411-1 to 411-N, 511-1 TO 511-L ANTENNA ELEMENT (RECEIVING ANTENNA ARRAY)
413, 513 CONTROL CIRCUIT
83 BEAM PATTERN (IMAGE)
84, 85 REFLECTOR
86 HUMAN BODY
61 WALL

The invention claimed is:

1. A control method of a wireless communication system comprising first and second communication devices, the second communication device comprising an antenna array, and an array weight vector (hereinafter "AWV") control circuit that changes at least one of amplitudes and phases of transmission signals or received signals of a plurality of antenna elements included in the antenna array, the control method comprising:
when an AWV of at least two antenna elements among the plurality of antenna elements included in the antenna array is independently controlled, (a) receiving, in the second communication device, while scanning a beam direction by changing an AWV of the antenna array of the second communication device, a training signal transmitted from the first communication device by using a fixed beam pattern;

(b) determining at least one direction of arrival (DOA) in the second communication device based on reception signal characteristics of the training signal;

(c) receiving, in the second communication device, the training signal transmitted by the first communication device while changing the AWV of the antenna array of the second communication device in such a manner that a null direction or a direction close to the null direction is successively pointed to one by one from the at least one DOA;

(d) comparing a reception signal characteristic obtained in the step (a) with a reception signal characteristic obtained in the step (c) for each of the at least one DOA, and specifying a DOA for which a ratio or a difference between these reception signal characteristics is smaller than a predefined threshold;

(e) obtaining at least one AWV each having a main beam direction or a sub-beam direction close to the main beam pointing to one of the at least one DOA in the second communication device determined in the step (b) except for the DOA specified in the step (d); and (f) using the at least one AWV obtained in the step (e) for communication between the first and second communication devices.

2. The control method of a wireless communication system according to claim 1, wherein the first communication device, similarly to the second communication device, comprises an antenna array, and an array weight vector (AWV) control circuit that changes at least one of amplitudes and phases of transmission signals or received signals of a plurality of antenna elements included in the antenna array, and the control method further comprises a step (g) of obtaining at least one AWV each having a main beam or a sub-beam direction close to the main beam pointing to one of at least one DOA in the first communication device by interchanging the transmitting operation and the receiving operation of the training signal performed by the first and second communication devices and then by performing the steps (a) to (e), and in the step (f), a combination of an AWV out of the at least one AWV obtained in the step (e) and an AWV out of the at least one AWV obtained in the step (g) is used for communication between the first and second communication devices.

3. The control method of a wireless communication system according to claim 1, wherein the step (b) comprises:

obtaining a data string representing a relation between DOAs and reception signal characteristics in the second communication device based on a reception result of the training signal; and determining the at least one DOA in the second communication device by using the data string.

4. The control method of a wireless communication system according to claim 3, wherein the steps (a) and (b) of scanning the beam direction by changing an AWV of the antenna array and obtaining the data string in the second communication device performing the receiving operation are performed by using a DOA estimation algorithm.

5. The control method of a wireless communication system according to claim 1, wherein the fixed beam pattern is an omni (nondirectional) pattern or a quasi-omni (quasi-nondirectional) pattern.

6. A control method of a wireless communication system comprising first and second communication devices, the second communication device comprising an antenna array, and an array weight vector (AWV) control circuit that changes at least one of amplitudes and phases of transmission signals or received signals of a plurality of antenna elements included in the antenna array, the control method comprising:

when an AWV of at least two antenna elements among the plurality of antenna elements forming the antenna array is independently controlled, (a) radiating, by the second communication device, a training signal while scanning a beam direction by changing an AWV of the antenna array in a state where the first communication device is performing a receiving operation by using a fixed beam pattern;

(b) determining at least one direction of departure (DOD) of the second communication device based on reception signal characteristics of the training signal in the first communication device;

(c) radiating, from the second communication device, the training signal while changing the AWV of the antenna array in such a manner that a null direction or a direction close to the null direction is successively pointed to one by one from the at least one DOD in a state where the first communication device is performing a receiving operation by using the fixed beam pattern;

(d) comparing a reception signal characteristic of the first communication device obtained in the step (a) with a reception signal characteristic of the first communication device obtained in the step (c) for each of the at least one DOD, and specifying an DOD for which a ratio or a difference between these reception signal characteristics is smaller than a predefined threshold;

(e) obtaining at least one AWV each having a main beam direction or a sub-beam direction close to the main beam pointing to one of the at least one DOD of the second communication device determined in the step (b) except for the DOD specified in the step (d); and (f) using the at least one AWV obtained in the step (e) for communication between the first and second communication devices.

7. The control method of a wireless communication system according to claim 6, wherein the first communication device, similarly to the second communication device, comprises an antenna array, and an array weight vector (AWV) control circuit that changes at least one of amplitudes and phases of transmission signals or received signals of a plurality of antenna elements included in the antenna array, and the control method further comprises a step (g) of obtaining at least one AWV each having a main beam or a sub-beam direction close to the main beam pointing to one of at least DOD in the first communication device by interchanging the transmitting operation and the receiving operation of the training signal performed by the first and second communication devices and then by performing the steps (a) to (e), and in the step (f), a combination of an AWV out of the at least one AWV obtained in the step (e) and an AWV out of the at least one AWV obtained in the step (g) is used for communication between the first and second communication devices.

8. The control method of a wireless communication system according to claim 6, wherein the step (b) comprises:
feeding back, to the second communication device, reception signal data indicating a reception result of the training signal measured in the first communication device;
obtaining a data string representing a relation between DODs in the second communication device and reception signal characteristics in the first communication device based on the reception signal data; and
determining the at least DOD in the second communication device by using the data string.

9. The control method of a wireless communication system according to claim 6, wherein the fixed beam pattern is an omni (nondirectional) pattern or a quasi-omni (quasi-nondirectional) pattern.

10. The control method of a wireless communication system according to claim 1, wherein a priority order is assigned to the at least one AWV obtained in the step (e) in a descending order of the reception signal characteristic, and wireless communication is performed by using an A WV that is selected one by one according to this priority order.

11. The control method of a wireless communication system according to claim 2, wherein the AWV combination between the first and second communication devices is determined by combining AWVs ranked at same places when AWVs obtained in each of the communication devices are arranged according to the reception signal characteristic obtained at the time of training.

12. The control method of a wireless communication system according to claim 11, wherein a priority order is assigned to at least one AWV combination obtained by the procedure recited in claim 11, in a descending order of the reception signal characteristic, and wireless communication is performed by using an AWV combination that is selected one by one according to this priority order.

13. The control method of a wireless communication system according to claim 2, wherein communication quality of at least one of the plurality of AWV combinations obtained in the procedure recited in claim 2 or 7 is measured, and an AWV combination to be used for communication is selected based on the measured communication quality.

14. The control method of a wireless communication system according to claim 13, wherein a priority order is assigned to at least one AWV combination obtained by the procedure recited in claim 13, in a descending order of the communication quality, and an AWV combination to be used for communication between the first and second communication devices is selected based on the priority order.

15. The control method of a wireless communication system according to claim 10, wherein communication quality is observed during communication; an AWV or an AWV combination at a next rank is selected according to the priority order in response to deterioration in the communication quality; and wireless communication is performed by applying the selected AWV or the AWV combination.

16. The control method of a wireless communication system according to claim 1, wherein the reception signal characteristic includes at least one of a received-signal power, a signal to noise ratio (SNR), a bit error rate (BER), a packet error rate (PER), and a frame error rate (FER).

17. The control method of a wireless communication system according to claim 1, wherein a first radio wave containing a signal that is mainly used for data communication, and a second radio wave having a smaller data transmission rate or a narrower transmission frequency band in comparison with the first radio wave; and a training is carried out by using the second radio wave.

18. The control method of a wireless communication system according to claim 4, wherein the DOA estimation algorithm is a beam former method.

19. A wireless communication system comprising:
a first communication device configured to be capable of emitting a signal in a fixed beam pattern; and
a second communication device comprising an antenna array, and an array weight vector (hereinafter "AWV") control circuit that changes at least one of amplitudes and phases of transmission signals or received signals of a plurality of antenna elements included in the antenna array, wherein
the first and second communication devices are configured to perform an AWV determination process, the AWV determination process comprising:
(a) receiving, in the second communication device, while scanning a beam direction by changing an AWV of the antenna array of the second communication device, the training signal transmitted from the first communication device by using the fixed beam pattern;
(b) determining at least one direction of arrival (DOA) in the second communication device based on reception signal characteristics of the training signal;
(c) receiving, in the second communication device, the training signal transmitted by the first communication device while changing the AWV of the antenna array of the second communication device in such a manner that a null direction or a direction close to the null direction is successively pointed to one by one from the at least one DOA;
(d) comparing a reception signal characteristic obtained in the step (a) with a reception signal characteristic obtained in the step (c) for each of the at least one DOA, and specifying a DOA for which a ratio or a difference between these reception signal characteristics is smaller than a predefined threshold;
(e) obtaining at least one AWV each having a main beam direction or a sub-beam direction close to the main beam pointing to one of the at least one DOA in the second communication device determined in the step (b) except for the DOA specified in the step (d); and
(f) using the at least AWV obtained in the step (e) for communication between the first and second communication devices.

20. A wireless communication system comprising:
a first communication device configured to be capable of receiving a signal in fixed beam pattern; and
a second communication device comprising an antenna array, and an array weight vector (hereinafter "AWV") control circuit that changes at least one of amplitudes and phases of transmission signals or received signals of a plurality of antenna elements included in the antenna array, wherein
the first and second communication devices are configured to perform an AWV determination process, the AWV determination process comprising:
(a) radiating, by the second communication device, a training signal while scanning a beam direction by changing an AWV of the antenna array in a state where the first communication device is performing a receiving operation by using the fixed beam pattern;
(b) determining at least one direction of departure (DOD) of the second communication device based on reception signal characteristics of the training signal in the first communication device;
(c) radiating, from the second communication device, the training signal while changing the AWV of the antenna array in such a manner that a null direction or a direction close to the null direction is successively pointed to one by one from the at least one DOD in a state where the first communication device is performing a receiving operation by using the fixed beam pattern;

(d) comparing a reception signal characteristic of the first communication device obtained in the step (a) with a reception signal characteristic of the first communication device obtained in the step (c) for each of the at least one DOD, and specifying an DOD for which a ratio or a difference between these reception signal characteristics is smaller than a predefined threshold;

(e) obtaining at least one AWV each having a main beam direction or a sub-beam direction close to the main beam pointing to one of the at least one DOD of the second communication device determined in the step (b) except for the DOD specified in the step (d); and (f) using the AWV obtained in the step (e) for communication between the first and second communication devices.

21. A wireless communication device comprising:
an antenna array;
an array weight vector (AWV) control unit that changes amplitudes and phases of received signals of a plurality of antenna elements included in the antenna array;
a receiving unit that performs a process for the received signals; and
a processing unit that determines an AWV used for wireless communication with a corresponding device, and supplies the determined AWV to the control unit, wherein the processing unit performs:

(a) determining at least one direction of arrival (DOA) based on reception signal characteristics obtained by receiving a training signal transmitted from the corresponding device at the receiving unit while scanning a beam direction by changing an A WV of the antenna array;

(b) comparing a reception signal characteristic obtained by receiving the training signal at the receiving unit while changing the AWV of the antenna array in such a manner that a null direction or a direction close to the null direction is successively pointed to one by one from the at least one DOA, with the reception signal characteristic obtained in the step (a), and specifying an DOA for which a ratio or a difference between these reception signal characteristics is smaller than a predefined threshold; and (c) obtaining at least one AWV each having a main beam direction or a sub-beam direction close to the main beam pointing to one of the at least one DOA determined in the step (a) except for the DOA specified in the step (b).

22. A wireless communication device comprising:
an antenna array;
an array weight vector (A WV) control unit that changes amplitudes and phases of transmission signals of a plurality of antenna elements included in the antenna array; and
a processing unit that determines an AWV used for wireless communication with a corresponding device, and supplies the determined AWV to the control unit, wherein the processing unit performs:

(a) determining at least one direction of departure (DOD) based on reception signal characteristics of a training signal in the corresponding device, the reception signal characteristics being obtained by radiating the training signal while scanning a beam direction by changing an A WV of the antenna array;

(b) comparing a reception signal characteristic of the training signal in the corresponding device obtained by radiating the training signal while changing the AWV of the antenna array in such a manner that a null direction or a direction close to the null direction is successively pointed to one by one from the at least one DOD, with the reception signal characteristic obtained in the step (a), and specifying a DOD for which a ratio or a difference between these reception signal characteristics is smaller than a predefined threshold; and (c) obtaining at least one AWV having a main beam direction or a sub-beam direction close to the main beam pointing to one of the at least one DOD determined in the step (a) except for the DOD specified in the step (b).

23. An array weight vector (hereinafter "AWV") adjustment method of a wireless communication device comprising an antenna array, and an A WV control unit that changes amplitudes and phases of received signals of a plurality of antenna elements included in the antenna array, the AWV adjustment method comprising:

(a) receiving, while scanning a beam direction by changing an A WV of the antenna array, a training signal transmitted from a corresponding device;

(b) determining at least one direction of arrival (DOA) based on reception signal characteristics of the training signal;

(c) comparing a reception signal characteristic obtained by receiving the training signal while changing the AWV of the antenna array in such a manner that a null direction or a direction close to the null direction is successively pointed to one by one from the at least one DOA, with the reception signal characteristic obtained in the step (a), and specifying an DOA for which a ratio or a difference between these reception signal characteristics is smaller than a predefined threshold;

(d) obtaining at least one AWV having a main beam or a sub-beam direction close to the main beam pointing to one of the at least one DOA determined in the step (b) except for the DOA specified in the step (c); and (e) using the at least one A WV obtained in the step (d) for wireless communication with the corresponding device.

24. An array weight vector (hereinafter "AWV") adjustment method of a wireless communication device comprising an antenna array, and an AWV control unit that changes amplitudes and phases of transmission signals of a plurality of antenna elements included in the antenna array, the AWV adjustment method comprising:

(a) radiating a training signal while scanning a beam direction by changing an AWV of the antenna array;

(b) determining at least one direction of departure (DOD) based on reception signal characteristics of the training signal obtained in a corresponding device;

(c) comparing a reception signal characteristic of the training signal in the corresponding device obtained by radiating the training signal while changing the A WV of the antenna array in such a manner that a null direction or a direction close to the null direction is successively pointed to one by one from the at least one DOD, with the reception signal characteristic obtained in the step (a), and specifying a DOD for which a ratio or a difference between these reception signal characteristics is smaller than a predefined threshold;

(d) obtaining at least one AWV having a main beam direction or a sub-beam direction close to the main beam pointing to one of the at least one DOD determined in the step (b) except for the DOD specified in the step (c); and (e) using the at least one AWV obtained in the step (d) for wireless communication with the corresponding device.

* * * * *